(12) United States Patent
Mortensen et al.

(10) Patent No.: US 9,594,636 B2
(45) Date of Patent: Mar. 14, 2017

(54) MANAGEMENT OF DATA REPLICATION AND STORAGE APPARATUSES, METHODS AND SYSTEMS

(71) Applicant: Datto, Inc., Norwalk, CT (US)

(72) Inventors: Spencer Mortensen, Norwalk, CT (US); Justin Giacobbi, Norwalk, CT (US)

(73) Assignee: Datto, Inc., Norwalk, CT (US)

( * ) Notice: Subject to any disclaimer, the term of this patent is extended or adjusted under 35 U.S.C. 154(b) by 34 days.

(21) Appl. No.: 14/292,737

(22) Filed: May 30, 2014

(65) Prior Publication Data

US 2015/0347548 A1    Dec. 3, 2015

(51) Int. Cl.
*G06F 17/00* (2006.01)
*G06F 11/14* (2006.01)

(52) U.S. Cl.
CPC .................................. *G06F 11/14* (2013.01)

(58) Field of Classification Search
None
See application file for complete search history.

(56) References Cited

U.S. PATENT DOCUMENTS

| | | | |
|---|---|---|---|
| 5,835,953 A | 11/1998 | Ohran | |
| 6,185,666 B1 | 2/2001 | Murray et al. | |
| 6,415,300 B1 | 7/2002 | Liu | |
| 6,691,245 B1 | 2/2004 | DeKoning | |
| 7,174,352 B2 | 2/2007 | Kleiman et al. | |
| 7,296,125 B2 | 11/2007 | Ohran | |
| 8,332,689 B2 | 12/2012 | Timashev et al. | |
| 8,346,726 B2 | 1/2013 | Liu et al. | |
| 8,438,347 B1* | 5/2013 | Tawri ................... | G06F 11/1456 711/114 |
| 8,635,429 B1 | 1/2014 | Naftel et al. | |
| 8,719,286 B1 | 5/2014 | Xing et al. | |
| 8,738,871 B1 | 5/2014 | Naftel et al. | |
| 2006/0064744 A1 | 3/2006 | Jung et al. | |
| 2007/0168058 A1* | 7/2007 | Kephart ................. | G05B 9/03 700/82 |
| 2009/0037655 A1* | 2/2009 | Cherian ................ | G06F 3/0608 711/114 |
| 2009/0037680 A1 | 2/2009 | Colbert et al. | |
| 2009/0300614 A1 | 12/2009 | Shimogawa | |
| 2010/0011120 A1 | 1/2010 | Kommula | |
| 2010/0011178 A1* | 1/2010 | Feathergill .......... | G06F 11/1466 711/162 |
| 2010/0042942 A1* | 2/2010 | Vasilevsky .......... | G06F 9/45533 715/764 |

(Continued)

OTHER PUBLICATIONS

Php-file-sync; GitHub; retrieved on Jan. 8, 2014 from <https://github.com/sergio-bobillier/php-file-sync>.

(Continued)

*Primary Examiner* — Hung Le
(74) *Attorney, Agent, or Firm* — Wilmer Cutler Pickering Hale and Dorr LLP

(57) ABSTRACT

The MANAGEMENT OF DATA REPLICATION AND STORAGE APPARATUSES, METHODS AND SYSTEMS ("BDR") transform machine datasets using BDR components into replications over a network distributing redundant ready-to-use backup files. In some implementations, the disclosure provides a processor-implemented method for managing the replication and storage of data sets.

40 Claims, 9 Drawing Sheets

Example Data Flow: Aspects of management of data replication and storage system

(56) References Cited

U.S. PATENT DOCUMENTS

| | | | |
|---|---|---|---|
| 2010/0077160 A1* | 3/2010 | Liu | G06F 3/0482 711/162 |
| 2010/0106691 A1* | 4/2010 | Preslan | G06F 11/1453 707/674 |
| 2011/0087874 A1* | 4/2011 | Timashev | G06F 9/44589 713/100 |
| 2011/0145199 A1* | 6/2011 | Prasad Palagummi | G06F 11/1435 707/654 |
| 2011/0154350 A1 | 6/2011 | Doyle et al. | |
| 2011/0307657 A1 | 12/2011 | Timashev et al. | |
| 2012/0016839 A1* | 1/2012 | Yueh | G06F 11/1435 707/624 |
| 2012/0159475 A1 | 6/2012 | Abbondanzio et al. | |
| 2012/0304170 A1 | 11/2012 | Morgan | |
| 2013/0042083 A1* | 2/2013 | Mutalik | G06F 17/30162 711/162 |
| 2013/0054536 A1* | 2/2013 | Sengupta | G06F 17/30289 707/654 |
| 2013/0104140 A1 | 4/2013 | Meng et al. | |
| 2013/0254196 A1 | 9/2013 | Babu et al. | |
| 2013/0262862 A1 | 10/2013 | Hartley et al. | |
| 2013/0290972 A1 | 10/2013 | Cherkasova et al. | |
| 2013/0298256 A1 | 11/2013 | Barnes et al. | |
| 2013/0339302 A1* | 12/2013 | Zhang | G06F 17/30581 707/649 |
| 2014/0006641 A1 | 1/2014 | James et al. | |
| 2014/0089727 A1 | 3/2014 | Cherkasova et al. | |
| 2014/0098671 A1 | 4/2014 | Raleigh et al. | |
| 2014/0149355 A1* | 5/2014 | Gupta | G06F 17/30008 707/652 |
| 2014/0172802 A1* | 6/2014 | Kato | G06F 11/1446 707/639 |
| 2014/0188805 A1* | 7/2014 | Vijayan | G06F 11/1453 707/646 |
| 2014/0229695 A1* | 8/2014 | Dinkar | H04L 67/1004 711/162 |
| 2014/0281355 A1 | 9/2014 | Trieu | |
| 2014/0351214 A1* | 11/2014 | Abercrombie | G06F 17/30575 707/626 |
| 2015/0058916 A1 | 2/2015 | Rostami-Hesarsorkh et al. | |
| 2015/0113239 A1 | 4/2015 | Katori et al. | |
| 2015/0161008 A1 | 6/2015 | Antony | |
| 2015/0227602 A1* | 8/2015 | Ramu | G06F 17/30575 707/634 |

OTHER PUBLICATIONS

Beary, Gregory; Synchronizing ZFS Filesystems; Greg Beary's Blog; Oct. 6, 2007; retrieved on Jan. 8, 2014 from <https://blogs.oracle.com/GregB/entry/synchronizing_zfs_filesystems>.

Round, Mark; ZFS Replication; Mark's Blog; Jul. 11, 2007; retrieved on Jan. 8, 2014 from <http://www.markround.com/archives/38-ZFS-Replication.html>.

Brown, Philip; ZREP Replication and Failover; retrieved on Jan. 8, 2014 from <http://www.bolthole.com/solaris/zrep/>.

McMillan, Paul; ZFS Sync Over Unreliable, Slow Wan. ZFS Replication, or Rsync?; Oct. 10, 2010; retrieved on Jan. 8, 2014 from <http://serverfault.com/questions/189420/zfs-sync-over-unreliable-slow-wan-zfs-replication-or-rsync>.

Zfsync; GitHub; retrieved on Jan. 8, 2014 from <https://github.com/jrssystemsnet/zfsync>.

Zfsync / Commits; GitHub; retrieved on Jan. 8, 2014 from <https://github.com/jrssystemsnet/zfsync/commits/master>.

International Search Report and Written Opinion mailed Sep. 8, 2016 from International Application No. PCT/US16/37696.

Office Action mailed Sep. 22, 2016 from U.S. Appl. No. 15/085,397.

* cited by examiner

Block Diagram: Aspects of the BDR backup network solution

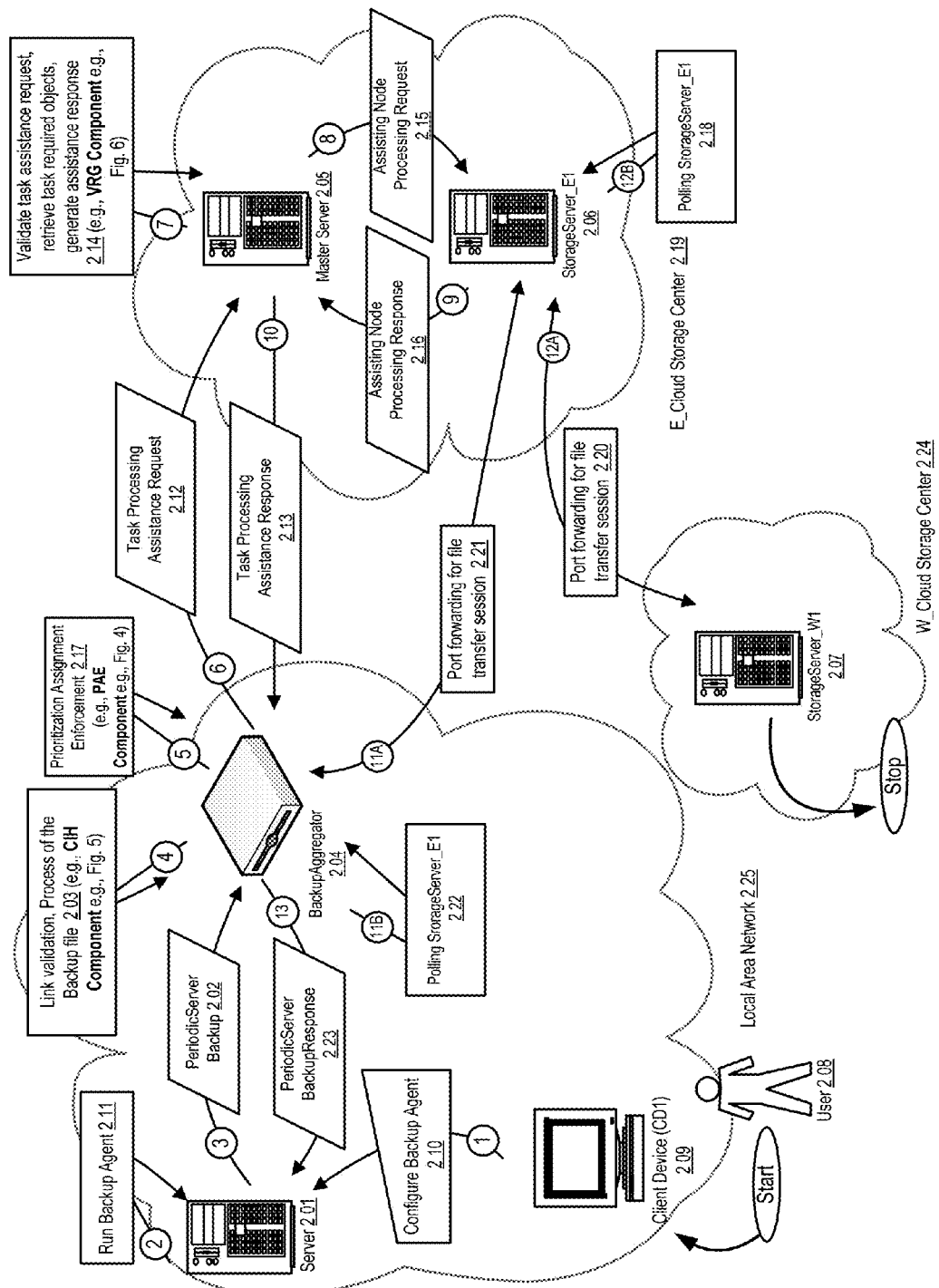
Figure 2 Example Data Flow. Aspects of management of data replication and storage system

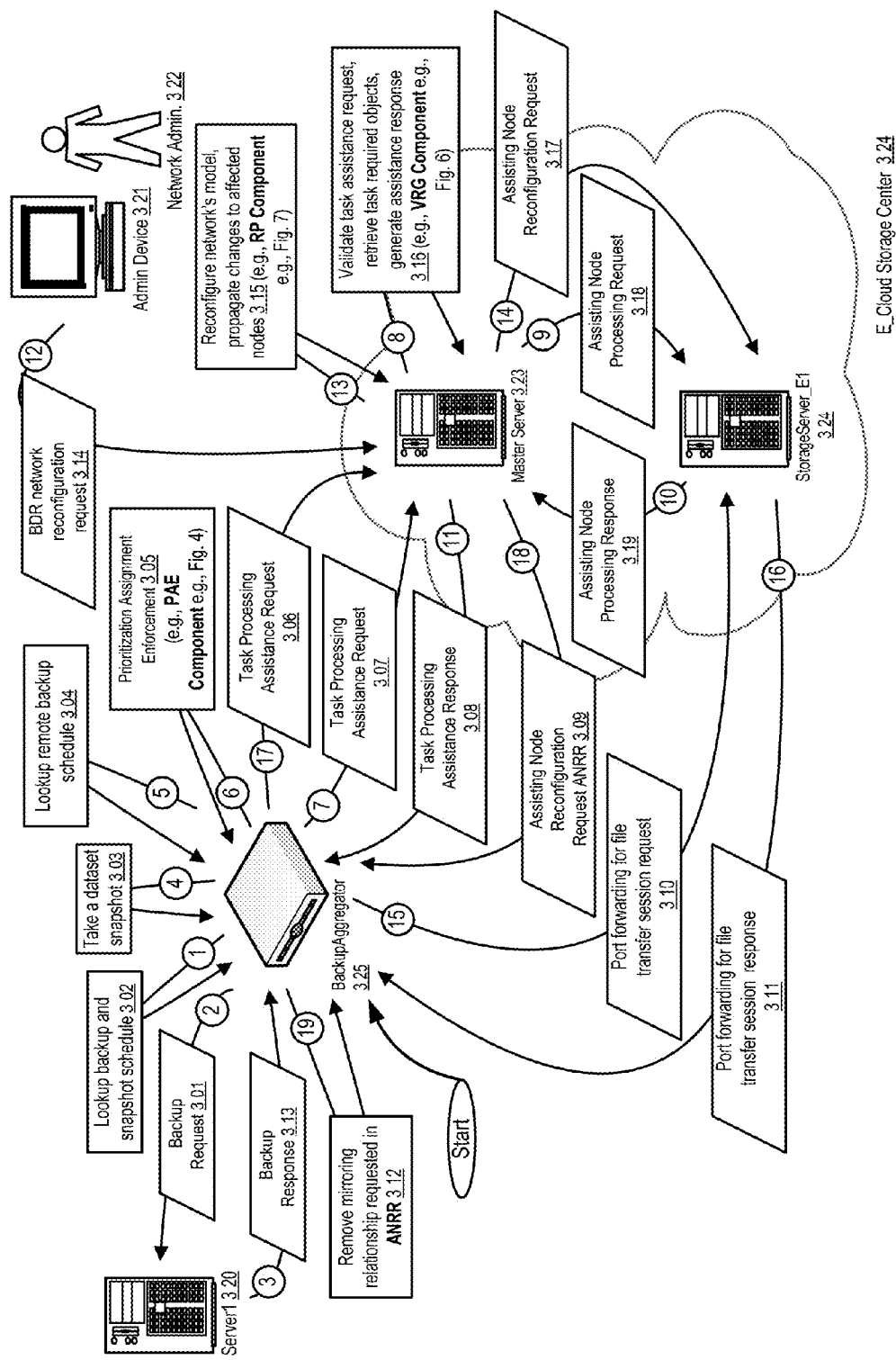
Figure 3  Example Data Flow: Management of data replication and storage system reconfiguration

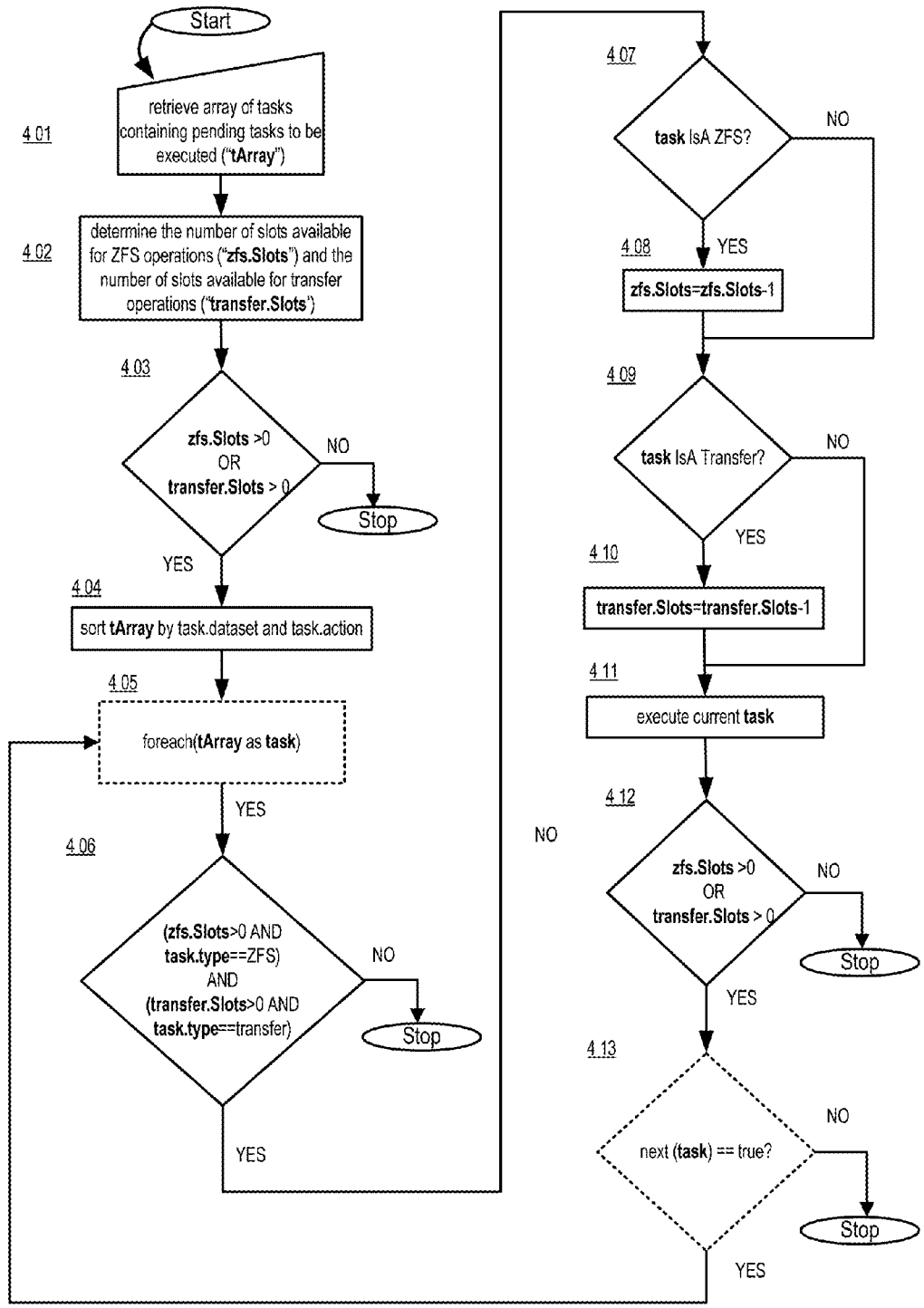
Figure 4  Example Logic Flow: Prioritization assignment enforcement component, e.g., PAE Component

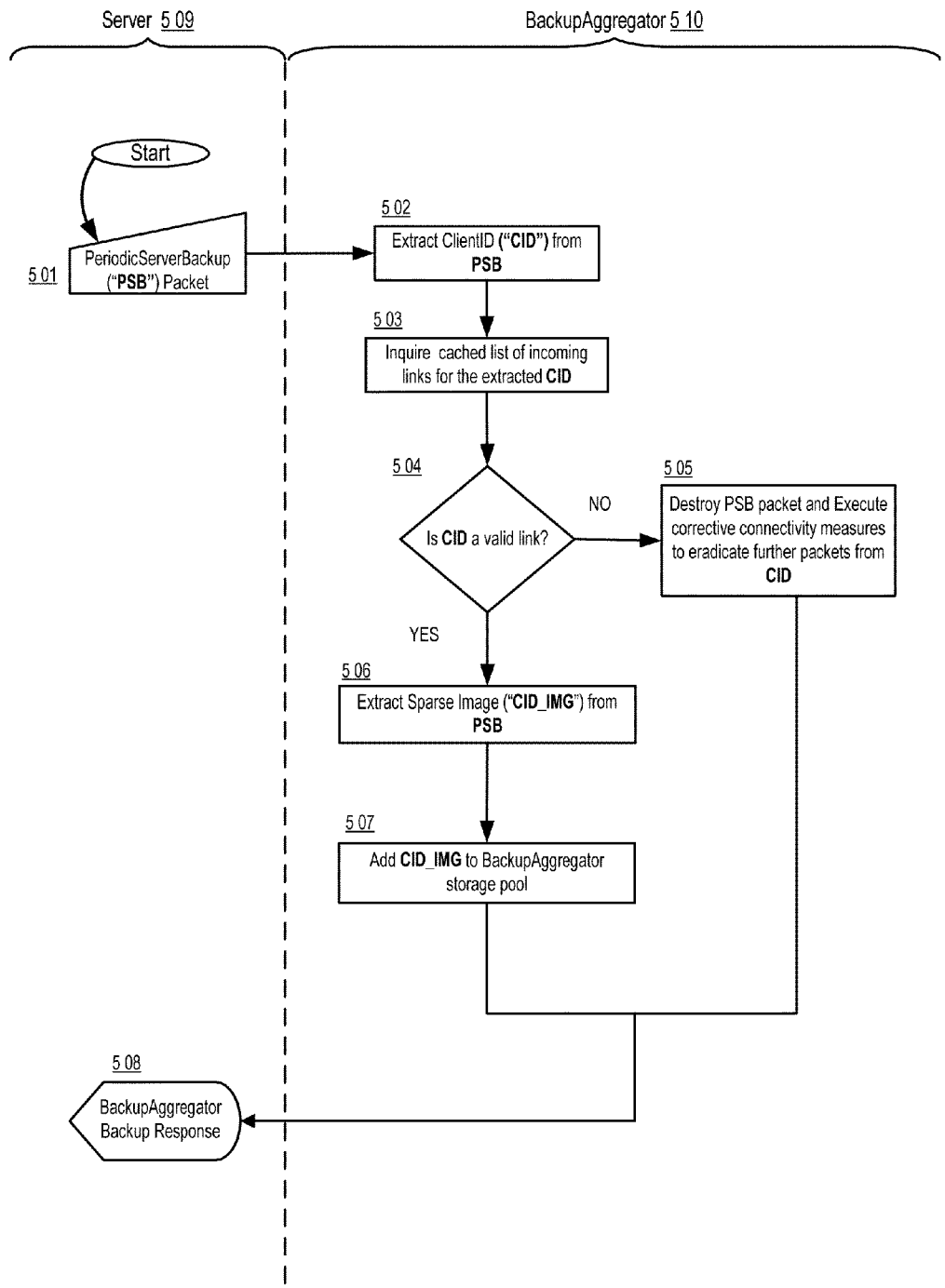
Figure 5      Example Logic Flow: BDR client image handler, e.g., CIH Component

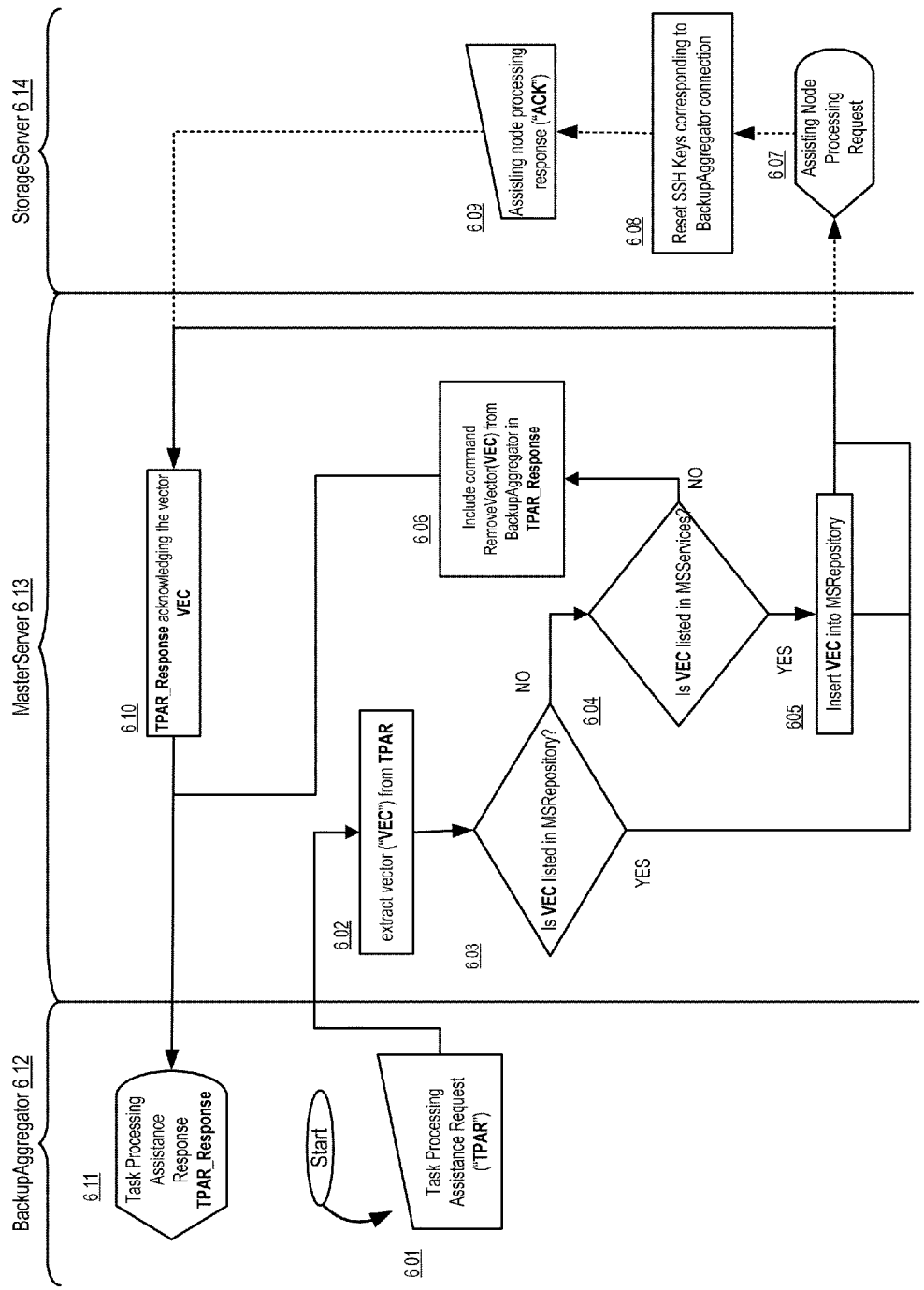
Figure 6  Example Logic Flow: BDR validation, retrieval and assistance generation response e.g., VRG Component Example Logic Flow: BDR network model reconfiguration and propagation of changes e.g., RP Component

MANAGEMENT OF DATA REPLICATION AND STORAGE APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address the generation, replication and synchronization of disk imaged backups, and more particularly, include MANAGEMENT OF DATA REPLICATION AND STORAGE APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. §112.

BACKGROUND

Many industries are changing the way they handle and protect data in response to compliance regulations, migration to electronic data, emerging data management strategies, and end-user demands. For example a loss of financial records can easily result in large monetary losses, and can subject businesses to government fines. Other examples are healthcare, and legal institutions that are also required to comply with data integrity government regulations which could potentially lead to severe noncompliance consequences. In addition, small businesses are generating more electronic data than ever and the value of that data is increasing. Simultaneously, there are more risks of losing data. Thus, backing up data in a reliable way may be desired by industries, small business and organizations alike.

BRIEF DESCRIPTION OF THE DRAWINGS

The accompanying appendices and/or drawings illustrate various non-limiting, example, innovative aspects in accordance with the present descriptions:

FIG. 2 shows an example data flow illustrating aspects of management of data replication and storage system, in one implementation of the BDR operation;

FIG. 3 shows an example data flow illustrating aspects of management of data replication and storage system reconfiguration, in one implementation of the BDR operation;

FIG. 4 shows an example logic flow illustrating aspects of prioritization assignment enforcement component, e.g., PAE Component, in one implementation of the BDR operation;

FIG. 5 shows an example logic flow illustrating aspects of the BDR client image handler, e.g., CIH Component in one implementation of the BDR operation;

FIG. 6 shows an example logic flow illustrating aspects of the BDR validation, retrieval and assistance generation response, e.g., VRG Component in one implementation of the BDR operation;

Figure 1A:
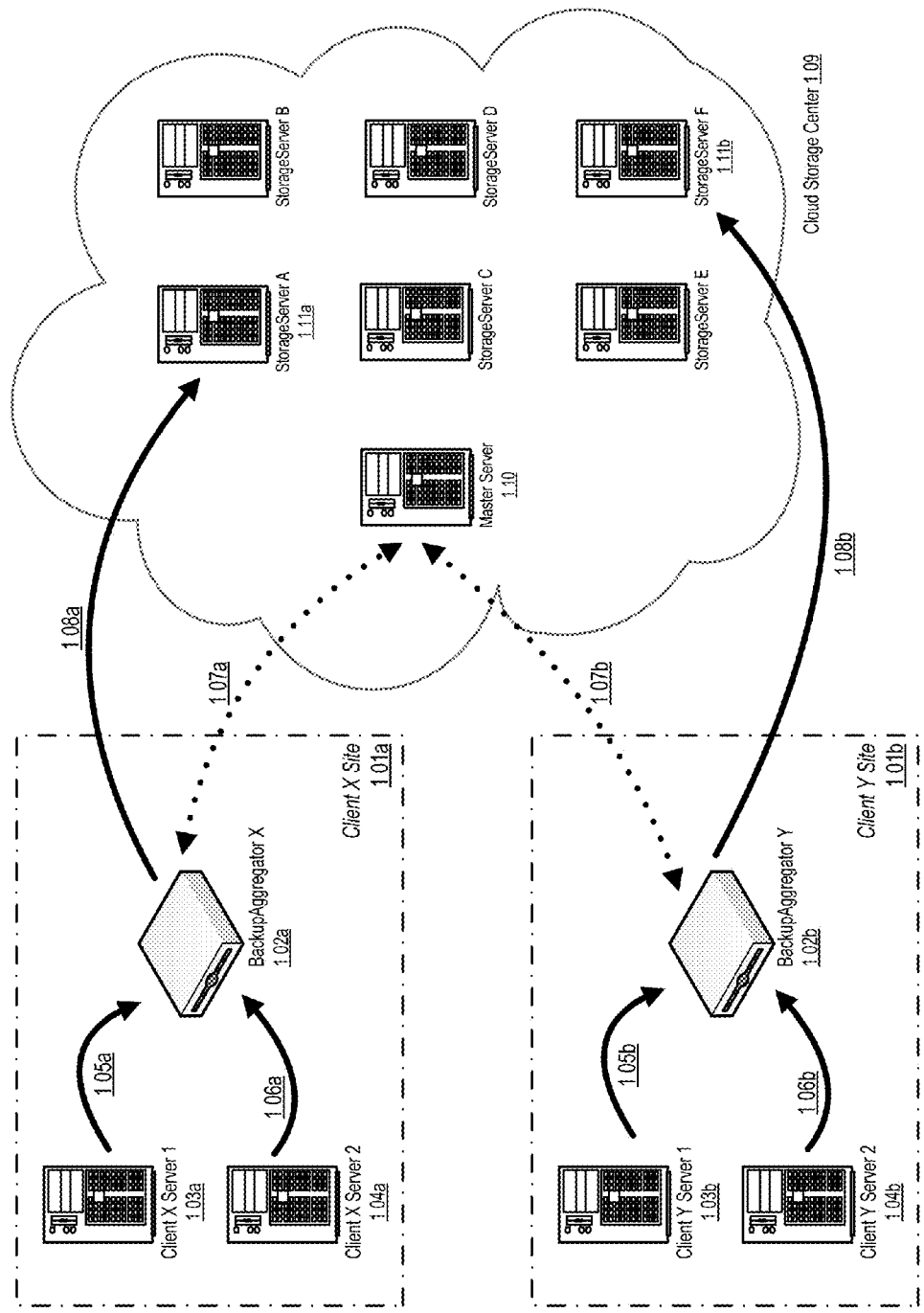
FIGS. 1A-B show an example block diagram illustrating aspects of the BDR backup network solution, in one implementation of the BDR operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

BDR

The MANAGEMENT OF DATA REPLICATION AND STORAGE APPARATUSES, METHODS AND SYSTEMS (hereinafter "BDR" user interface) synchronizes storage nodes in a replication network, via BDR components, in response to user inputs and scheduled backups. In some embodiments, this is carried out in real time.

In one embodiment, the BDR monitors block level changes as they occur on a plurality of physical or virtual hard disks performing block-based backups and storing substantially ready-to-run disk images (e.g., VMDK, VHDX, VDI and/or the like formats) corresponding to the latest and/or multiple previous restore points of a hard disk life span. In some embodiments, the previous restore points may be represented as snapshots stored in a file system capable of snapshotting (such as, for example, ZFS). In one embodiment, a ready-to-run disk image as described herein is a file stored in a format that is ready to be booted, mounted and/or exported to a virtual host. In another embodiment, a ready-to-run disk image may be pre-appended with a header to be booted, or mounted in a virtual host. Having ready-to-run images allows the BDR system to facilitate effective failover strategies such as instant on-site and off-site virtualization. In another embodiment, the BDR system relies on its ability to take block-based snapshots capable to contain information for an entire file system occupying significantly less memory space than full size images. Because the BDR applies incremental ascend images upon receipt and integrates them into a file system there is no need to store a series of previous incremental backups once applied. In still another embodiment, the BDR system comprises a management engine regulating in real time the offsite transfer and replication of backup files. Yet in another embodiment, the memory space preservation provided by the BDR's backup technology and the BDR's backup management engine allows the generation and transfer of backup files at a high rate, mapping an extensive number of points-in-time of a hard disk without rapidly reaching storage space or bandwidth constraints.

In one embodiment, the BDR components provide complete and swift recovery of data corresponding to multiple restore points but unlike conventional image-based backup and recovery systems the BDR does not require the bandwidth to either transfer full size disk images to and from the cloud or transfer backup files to the cloud for each of the restore points that a client may want to maintain. For example, the BDR may implement a policy to backup a client's device to a local storage node on an hourly basis providing the client's device with multiple one hour apart restore points. The BDR may also convert or merge two or more hourly backup files into a single backup representation containing the changes made to the client's device during the lapse of the selected hours and send it to a cloud-based storage system. Therefore, the client's device may be able to rollback to restore points generated on hourly basis or restore points separated by a certain number hours apart chosen by the user. Moreover, the restore points may be expunged from the BDR system based on memory space preservation policies that may be configured by the client defining a number of hours, days, months or year's worth of data the client may want to maintain.

In one embodiment, the BDR leverages a file system capable of snapshotting contents in a manner that allows for the efficient storage of the most recent substantially ready-to-run disk image (e.g., the last Mock-level image based backup). However, previous versions of the substantially ready-to-run disk image may be represented in the file system of the BDR server holding the substantially ready-to-run disk image (or another server in communication with the BDR). In such a configuration, the BDR may avoid the requirement to retain multiple files representing incremental changes to the physical or virtual hard disk being backed up (e.g., the hard drive represented by the substantially ready-to-run disk image). Upon receipt of a new substantially ready-to-run disk image, the BDR may overwrite the currently stored version of the substantially ready-to-run disk image. The BDR may thereafter perform a local file system snapshot such that the differential between the previous and current substantially ready-to-run disk image is tracked by the file system itself. This BDR feature provides at least the feature of allowing the BDR to maintain the currently active substantially ready-to-run disk image in a state that represents the last backup. Advantageously, in a disaster event, the BDR does not need to incrementally build or create a substantially ready-to-run disk image because it is already created and stored by the BDR as described above. In cases where the BDR is called upon to provide a substantially ready-to-run disk image of an image at a previous point in time, the BDR may execute a file system command to make a previous snapshot of the current substantially ready-to-run disk image available for instantiation. Based on the manner in which some snapshot capable file systems operate, the time to instantiation of the previous snapshot may be substantially faster than a procedure whereby multiple incremental changes are applied to a base backup or image to determine or create the needed substantially ready-to-run disk image. Furthermore, the above BDR configuration may provide substantial overhead savings in the potentially more common case wherein the most recent substantially ready-to-run disk image is the disk image to be instantiated (e.g., taking advantage of the fact that in most disaster recover situations the most recent backup is the desired backup).

In one embodiment, the BDR may be configured to initiate an underlying snapshot capable file system command to merge two or more file system maintained snapshots into a single snapshot representation. For example, in one configuration the BDR may generate hourly snapshots of the substantially ready-to-run disk image (such a schedule corresponding to, but lagging, the BDR's receipt of an updated substantially ready-to-run disk image). After a period of one week, the oldest hourly snapshots may be merged by the underlying snapshot capable file system at the direction of the BDR. By utilizing the underlying file system's representation of the substantially ready-to-run disk image at various points in time—as opposed to, for example, incremental files representing each hour of changes—the BDR may take advantage of efficiencies in merging incremental snapshots that are not available in other backup systems. For example, files that are created and then deleted between the first and last hourly snapshot being merged may be skipped completely in determining the merged snapshot because the underlying file system may be aware of the file status over time while a configuration applying incremental changes would only be aware of the one-hour differences to the substantially ready-to-run disk image.

Furthermore, the above configuration of the BDR may allow for the more efficient management and generation of remote synchronization files (such as replication files as discussed herein with respect to FIG. 2) because the local BDR device (for example, a backup aggregator) may have a backup retention schedule that differs from the remote BDR device. As such, the local BDR device may in some embodiments generate custom replication files that represent substantially ready-to-run disk image states at times spaced apart further than that actually available (e.g., replication files representing daily overall changes to the underlying snapshot file system, whereas the underlying snapshot file system itself stores hourly snapshot information). The ability of the BDR to store previous states of a single substantially ready-to-run disk image in a manner that allows the computationally efficient determination of exactly the differences that should be applied to a remote BDR device snapshot file system to allow the remote BDR device to determine the state of the substantially ready-to-run disk image according to its own backup schedule may be utilized by a BDR administrator to optimize network transfer requirements and push required computational processing overhead to devices that are best able to perform them.

In another embodiment, other types of policies may be implemented for example, a maximum rolling retention policy may be configured to retain restore points according to a repository's maximum storage capacity, once the storage limit is about to be reached then any number of intermediate segments may be removed from the repository without affecting the functionality of the latest restore point.

FIG. 1A shows a block diagram illustrating example aspects of a BDR enabled backup network. In one embodiment, the BDR may provide an image based backup solution wherein a local device, e.g. a backup aggregator 102a, is responsible for and facilitates the aggregation of image-based backups from a plurality of client devices local to and/or in communication with the backup aggregator. For example, in one embodiment, a given BDR client site, e.g. 101a, may have one or more backup aggregators in communication on a local area network, e.g. backup aggregator 102a. Client devices, which may be servers, workstations, laptops, and/or the like, e.g. 103a, 104a, may also be in communication with backup aggregator 102a and periodically transfer a representation of a block level storage device to backup aggregator 102a, e.g. 105a, 106a. The backup aggregator may thereafter generate a snapshot of the received image backup file(s) according to a local backup schedule. The snapshot operation may be server specific, such as for example a local backup snapshot policy that generates hourly backups for a mission-critical mail server while only generating daily snapshots of image backup files from a user's laptop. The BDR may also be configured such that the transfer of image-based backup files from client devices (such as servers, workstations, laptops, etc. described above) may differ from the local snapshot policy itself.

In one embodiment, backup aggregator 102a may maintain such a local backup policy while additionally maintaining a remote backup policy. The remote backup policy may be a backup policy maintained at the backup aggregator that determines how frequently the backup aggregator will synchronize certain image based backup file snapshot data with remote cloud storage center 109. In one embodiment, backup aggregator 102a may coordinate the execution of its remote backup schedule with a master server 110, e.g. 107a. The master server may receive from the backup aggregator an indication of the backup aggregator's last known storage server pairing within the cloud storage center 109. A storage server, for example StorageServer A 111a, may be a server that is directly paired with the backup aggregator such that is capable of receiving and applying to its own snapshot capable file system a received send file representing the file system differences between image based file backups snapshotted at two different points in time.

In one embodiment, after coordinating with master server 110, backup aggregator 102a may thereafter initiate a send file transfer operation, e.g. 108a, with its paired storage server 111a within the cloud storage center. In some embodiments, storage server 111a may itself have a paired or file system mirroring relationship with a second storage server. Such a BDR configuration may be useful in cases where the image based backup snapshot history maintained on the backup aggregator would be advantageously stored on both the backup aggregator's paired server, e.g. 111a, and a secondary storage server located in a different geographical location. Such a configuration may enable recovery of cloud storage center stored image snapshot data even in scenarios where cloud storage center 109 is completely destroyed.

Furthermore, in one embodiment, the master server may direct the activity of multiple backup aggregators as well as manage or direct the pairing of backup aggregators with different storage server nodes within cloud storage center 109, e.g. 101B-108B, 111B. It should be understood that the maintenance of the local or remote backup policy need not necessarily be performed by a backup aggregator device. For example, the master server or a storage server could instead maintain a backup policy associated with the backup aggregator. In such a configuration, the coordination of the backup aggregator with the master server may, for example, additionally comprise sending or receiving information about the currently active local or remote backup policy associated with the backup aggregator.

Figure 1B:
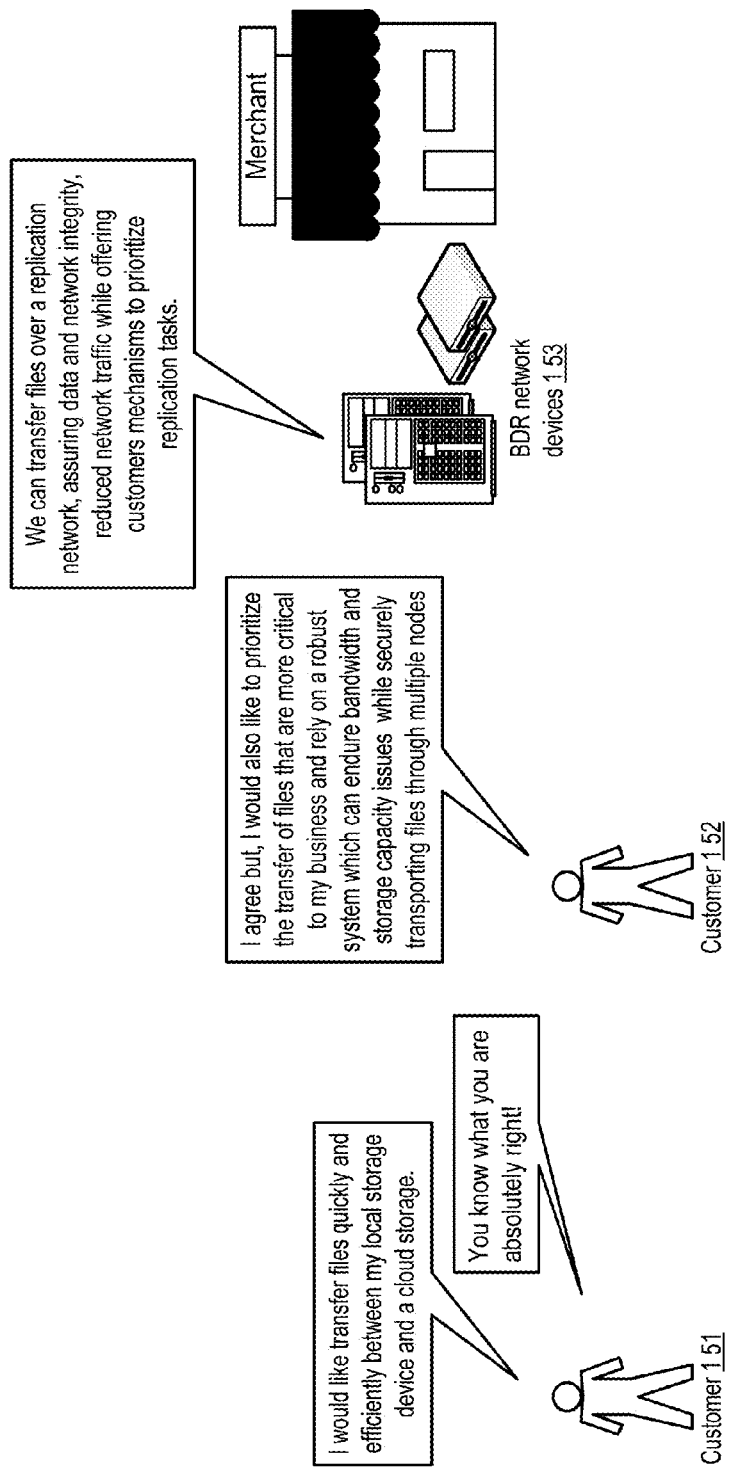

FIG. 1B shows a block diagram illustrating example aspects of a BDR enabled backup network, in some embodiments of the BDR. In one embodiment, a user may have wish to transfer backup files quickly and efficiently between a local storage device and a cloud or remote storage center. Additionally a different user may need a prioritization system which can grant the right of precedence to backup files that are defined as more critical to the user, business or organization e.g., 152. In some embodiments, the user (e.g., individuals, business, organizations and the like) may employ the BDR system to transfer backup files over a replication network, assuring data and network integrity, and reduced network traffic while providing mechanisms to prioritize replication tasks e.g., 153. In some embodiments, the BDR users may be local, remote or mobile, and the hardware devices the users utilize to access the cloud storage may or may not be managed by the user and-or a third party.

FIG. 2 shows an example data flow illustrating aspects of management of data replication and storage system, in one implementation of the BDR operation. In one embodiment servers, workstations, mobile devices and the like may protect their data locally across a local area network e.g., 225 to a local network device e.g., 204 from there it may automatically be replicated to a plurality of cloud storage centers e.g., 219 and 224.

In one embodiment, user 208 in communication with client device 209 configures a backup agent e.g., 210 installed on server 201 to perform a backup and replicate it over a plurality of storage devices utilizing features of the BDR. Thereafter, server 201 may run its backup agent e.g., 211 which may be programmed to generate and send periodic backup files e.g., 202 to a BackupAggregator e.g., 204. A periodic backup file (e.g., 202) may comprise an image-based backup. An image-based backup is a block by block copy of a full hard-drive. A block refers to a specific physical area on a hard-drive which may contain data. Therefore, an image-based backup represents the content exactly as it was on the original storage device at the time the backup file was generated including operating system, and all data associated with it, the data stored in the system along with structural information and application configurations. However, the source used to create the image backup file need not actually be a physical hard drive and may, for example, be a virtual hard disk or even another image backup file. The embodiments described herein may be utilized on backup files that are based on a different formatting scheme but otherwise lend themselves to processing by the described embodiments of the BDR. Once generated, block level image backup files may serve as the basis for restoring a hard drive to a substantially similar state as present at the time of backup. Image backup files may contain additional data elements such as file system metadata that was present on the source drive, master boot records, partition information and/or the like. This manner of backup may be distinguished from what may be thought of as a "file/directory level" backup which merely duplicates the contents and location of files and/or directories contained on a hard drive without necessarily including additional metadata, file system data, etc. An example server backup file 202, substantially in the form of an HTTP(S) POST message including XML-formatted data, is provided below:

```
POST /server_backup_file.php HTTP/1.1
Host: www.backupaggregator.com
Content-Type: Application/XML
Content-Length: 667
<?XML version = "1.0" encoding = "UTF-8"?>
<device_backup_file>
    <timestamp>2020-12-12 09:22:43</timestamp>
    <client_ID>7023</client_ID>
    <device_credentials>
        <password>secretpass1234</password>
        <private_key>d519jdwiopeq697#@hnniimidrtsxbi</private_key>
    </device_credentials>
    <health_metrics>
        <CPU_temperature>37</CPU_temperature> //In Celsius
```

```
            <fan_speed> // In RPM
                <CPU>3500</CPU>
                <power_supply>3700</power_supply>
                <system_fan1>3100</system_fan1>
            </fan_speed>
            <voltage>
                <CPU>.97</CPU>
                <DDR>1.5</DDR>
                <threeV>3.36</threeV>
                <fiveV>5.08</fiveV>
                <twelveV>12.22</twelve>
            <voltage>
            <CPU_utilization>.07</CPU_utilization> //In Percent
            <memory_utilization>.62</memory_utilization>
            <disk_utilization>.41</disk_utilization>
        </health_metrics>
        <CID_IMG id=7145>
            <SPARSE_header>
                <SPARSE_MAGICNUMBER>0X564d4444b</SPARSE_MAGICNUMBER>/*'V'
'M' 'D' 'K' */
                <version>2</version>
                <capacity>8388608</capacity>//capacity of this extent in
sectors - a multiple of grain size
                <grainSize>128</grainSize> //is the size of the grain in
sectors
            </SPARSE_header>
            <grain_directories>
                <GDE_0>00000001</GDE_0> //sector offset to grain table #0
            </grain_directories>
            <grain_table id=0 sector_offset=00000001>
                <GTE_0>00000040</GTE_0>//sector offset to grain/block 0
                <GTE_1>00000080</GTE_1>//sector offset to grain/block 1
            </grain_tables>
            <data_blocks>
                <block id=0 grain_table=0 sector_offset=00000040>
                01000100 01100001 01110100 01110100 01101111 00100000
01110000 01110010 01101111 01100100 01110101 01100011 01110100
01110011 00100000 01110010 01110101 01101100 01100101...
                </block>
                <block id=1 grain_table=0 sector_offset=00000080>
                01000100 001000001 01010100 01010100 01001111 00100000
01001111 01000110 01000110 01000101 01010010 01010011 00100000
01010100 01001000 01000101 00100000 01000010 01000101 01010011
01010100 00100000 01000010 01000100 01010010 00100000 01010011
01011001 01010011 01010100 01000101 01001101 00100000 01001001
01001110 00100000 01010100 01001000 01000101 00100000 01001101
001000001 01010010 01001011 01000101 01010100...
                </block>
            </data_blocks>
        </CID_IMG>
</device_backup_file>
```

In one embodiment, the BackupAggregator 204 may receive a periodic server backup file e.g., 202. Afterward, the BackupAggregator 204 may validate the link which connects it to the server 201 and may process the received backup file. Further details with respect to link validations and the processing of backup files, e.g., 203 are described herein and particularly with respect to an example CIH Component e.g., FIG. 5.

In one embodiment, the BackupAggregator may perform backups, replication and restoration tasks following a prioritization order defined by the user 208. A non exhaustive list of BDR tasks that may be used with the systems, methods and apparatuses described herein is illustrated in the following Table 1.

TABLE 1

| Task ID | Task | Description |
| --- | --- | --- |
| S10 | takeSnapshot | Generates a read-only full copy of the file system volume |

TABLE 1-continued

| Task ID | Task | Description |
| --- | --- | --- |
| S20 | destroySnapshot | Deletes a snapshot from the storage pool |
| S30 | holdSnapshot | Prevents a snapshot from being destroyed |
| S40 | fetchSnapshot | Returns the last snapshot taken for a dataset |
| S50 | rollBack | Discards all changes made to a file system since an specific backup or snapshot was created |
| S60 | createClone | Creates a writable volume or file system whose initial contents are the same as the dataset from which it was created |
| S70 | compressFile | Reduces the size of a file |
| S80 | decompressFile | Convert the file to its original form size |
| S90 | generateIncremental | Keeps the files that have been altered between two given snapshots. |
| S100 | sendFile | Exports a file from the local file system to a compressed file stored locally on the sending machine, and then the file is sent to the receiving machine using the syncFile command. |

TABLE 1-continued

| Task ID | Task | Description |
|---|---|---|
| S110 | streamFile | Exports a file from the local file system and the data is compressed as it is generated and streamed directly to the receiving machine. |
| S120 | receiveFile | Receives a file in a local directory of the receiving machine, then the file is extracted and imported to the receiving machine's file system. |
| S130 | sshKeyGeneration | Generates private and public keys for ssh tunneling session |
| S140 | sshConnect | Starts a tunneling session between two devices |
| S150 | syncFile | Synchronizes files and directories from one location to another minimizing data transfers by using delta encoding when possible. |
| S160 | runScheduler | Runs a time-based job scheduler configured to perform tasks periodically on different entities of the BDR system |
| S180 | failover | Provides the means via virtualization or the restoration of a redundant system to move the activity on one device e.g., computer, server, system, or hardware component to another device in the event the first device is or expected to be no longer available. |
| S190 | calculateHealthMetrics | Retrieves a plurality of metrics including but not limited to fan speed, CPU temperature, disk space, memory space, power supply voltages and the like. |

In another embodiment, the BDR may perform composite tasks comprising two or more simple or composite tasks. For example the composite task backupDataset shown in Table 2 may comprises the tasks S10, S40, s90, s70, and s100.

TABLE 2

| Task ID | Parent Task ID | Task | Description | TaskID | subTask |
|---|---|---|---|---|---|
| C10 | null | backupDataset | Generates a backup file corresponding to a dataset and sends it to a repository | S10<br>S40<br>S90<br>S70<br>S100 | takeSnapshot<br>fetchSnapshot<br>generate-<br>Incremental<br>compressFile<br>sendFile |

A user may prioritize the transfer of certain type of files regardless from which device they have been received and/or may prioritize the transfer of files related to a specific machine depending on what the user deems as critical and/or necessary data. Furthermore, a second level of prioritization that conditionally favors certain tasks depending on the type of action they comprise may be utilized. For example a second level priority order may be determined where tasks that specify a building file e.g., generateIncremental may have precedence over tasks that specify a streaming action. Similarly a task that specifies a sending action e.g., syncFile call, may have precedence over tasks specifying building actions; lastly, tasks specifying a receiving action e.g., receiveCall may have precedence over tasks specifying a sending action and therefore all other type of tasks (i.e., building and streaming). In one embodiment, the BDR may prioritize the processing of tasks based on the last successful sendFile operation. For example, if a number of sendFile operations for a particular replication incremental file have failed due to transient network issues, the BDR may prioritize the next sendFile operation (or one containing a send-File operation) over other operations even if the BDR's default prioritization would otherwise instruct. Further details with respect to prioritization assignment enforcement, e.g., 217 are described herein and particularly with respect to an example PAE Component e.g., FIG. 4)

In one embodiment, the BackupAggregator may send a task processing assistance request e.g., 212 to a master server e.g., 205. A task processing assistance request may be triggered periodically (e.g. every 10 minutes) and/or in response to determined events e.g., a failing to connect with a remote storage server. An example task processing assistance request 212, substantially in the form of an HTTP(S) POST message including XML-formatted data, is provided below:

```
POST /task_processing_assistance_request.php HTTP/1.1
Host: www.masterserver.com
Content-Type: Application/XML
Content-Length: 667
<?XML version = "1.0" encoding = "UTF-8"?>
<tpa_request>
    <timestamp>2020-12-12 15:00:00</timestamp>
    <device_ID>10455</device_ID>
    <device_credentials>
        <password>secretpass1234</password>
        <private_key>h767kwjiwnfe456#@hnniimidrtsxbi</private_key>
    </device_credentials>
    <tpa_type>periodic</tpa_type>
    <tpa_interval units=min>10</tpa_interval>
    <old_public_key key_format=RSA genTime=14:45:00>3048 0241
00C9 18FA CF8D EB2D EFD5 FD37 89B9 E069 EA97 FC20 5E35 F577
EE31 C4FB C6E4 4811 7D86 BC8F BAFA 362F 922B F01B 2F40 C744
2654 C0DD 2881 D673 CA2B 4003 C266 E2CD CB02 0301
0001</old_public_key>
    <new_public_key key_format=RSA genTime=14:55:00>0479 BE66
7EF9 DCBB AC55 A062 95CE 870B 0702 9BFC DB2D CE28 D959
F281 5B16 F817 9848 3ADA 7726 A3C4 655D A4FB FC0E 1108
A8FD 17B4 48A6 8554 199C 47D0 8FFB 10D4 B8DA 41F4 23FA
A25E 012B</new_public_key>
    <backup_vector id=0016>
        <primary id=0177>
            <type>siris_device</type>
            <index>10455</index>
            <region>NY_SE</region>
        </primary>
        <secondary id=0081>
            <type>server</type>
            <index>578</index>
            <region>westDCenter</region>
        </secondary>
        <dataset id=012>
            <origin>277</origin>
            <type>agent</type>
            <name>smmagent</name>
        </dataset>
    </backup_vector>
    <failover_vector id=0026>
        <primary id=0081>
            <type>server</type>
            <index>578</index>
            <region>westDCenter</region>
        </primary>
        <secondary id=0178>
            <type>siris_device</type>
            <index>10456</index>
            <region>NY_NE</region>
        </secondary>
        <dataset id=012>
            <origin>277</origin>
            <type>agent</type>
            <name>smmagent</name>
        </dataset>
    </failover_vector>
    <backup_history>
        <snapshot id=326>
            <name>pool/home/dataset012@monday</name>
            <creation>2020-12-12 14:50:00</creation>
```

```
    <used unit=KB>23.3</used>
  </snapshot>
  <snapshot id=325>
    <name>pool/home/dataset012@monday</name>
    <creation>2020-12-12 14:40:00</creation>
    <used unit=KB>21.3</used>
  </snapshot>
  <snapshot id=324>
    <name>pool/home/dataset012@monday</name>
    <creation>2020-12-12 14:30:00</creation>
    <used unit=KB>21.3</used>
  </snapshot>
  </backup_history>
</tpa_request>
```

In one embodiment, a master server e.g., 205 may receive a task processing assistance request from a BackupAggregator. Thereafter, the master server may perform a validity check of the task processing assistance request, retrieve task required objects which depending on the requester (i.e., BackupAggregator) may be one or more commands that may need to be executed and/or reconfiguration related tasks, the outcome of such commands will be included in a task processing assistance response e.g., 213 which may be sent to the requester at a later time. Further details with respect to the validation, retrieval and generation of the assistance response, e.g., 214 are described herein and particularly with respect to an example VRG Component e.g., FIG. 6)

In one embodiment, a master server e.g., 205 may send an assisting node processing request e.g., 215 to a storage server e.g., 206. An assisting node processing request may be triggered periodically (e.g., every 10 min) and/or in response to determined events e.g., a reconfiguration of the BDR system. In one embodiment, an assistance node processing request may specify commands that are required to be performed by the storage server including but not limited to calculating how much disk space is available in the storage server, updating software e.g., file system software, logical volume manager software and the like. An example assisting node processing request 215, substantially in the form of an HTTP(S) POST message including XML-formatted data, is provided below:

```
POST /assisting_node_processing_request.php HTTP/1.1
Host: www.storageserver.com
Content-Type: Application/XML
Content-Length: 667
<?XML version = "1.0" encoding = "UTF-8"?>
<anp_request>
  <timestamp>2020-12-12 15:00:00</timestamp>
  <device_ID>2027</device_ID>
  <device_credentials>
    <password>secretpass1234</password>
    <private_key>j341engi648et456#@hnnengywrksxbi</private_key>
  </device_credentials>
  <tpa_type>periodic</tpa_type>
  <tpa_interval units=min>10</tpa_interval>
  <command id=001 type=DELETE>)
    <vector id=0016>
      <old_public_key key_format=RSA genTime=14:45:00> 3048
0241 00C9 18FA CF8D EB2D EFD5 FD37 89B9 E069 EA97 FC20 5E35
F577 EE31 C4FB C6E4 4811 7D86 BC8F BAFA 362F 922B F01B 2F40
C744 2654 C0DD 2881 D673 CA2B 4003 C266 E2CD CB02 0301
0001</old_public_key>
    </vector>
  </command>
  <command id=002 type=INSERT>
    <vector id=0016>
      <new_public_key key_format=RSA genTime=14:55:00> 0479
BE66 7EF9 ECBB AC55 A062 95CE 870B 0702 9BFC DB2D CE28
D959 F281 5B16 F817 9848 3ADA 7726 A3C4 655D A4FB FC0E 1108
A8FD 17B4 48A6 8554 199C 47D0 8FFB 10D4 B8DA 41F4 23FA A25E
012B </new_public_key>
    </vector>
  </command>
  <command id=003 type=DELETE>
    <vector id=0147>
      <old_public_key key_format=RSA genTime=14:45:00> 73C4
41F5 C817 9848 3ADA 7726 A3C4 C124 199C 45D0 8FFB 00D4 F8DA
B1F4 8554 B99C 47D0 0EFB 30D4 B8DA 41F4 17B4 48A6 8554 199C
47D0 F281 5B16 2817 9848 3ADA 9726 A3C4 655D 3ADA 7726 A3C4
E35D
</old_public_key>
    </vector>
  </command>
  <command id=004 type=INSERT>
    <vector id=0147>
      <new_public_key key_format=RSA genTime=14:55:00> F281
5B16 A805 9848 3ADA 7726 A3C4 B124 199C 47D0 8FFB 10D4 B8DA
41F4 8554 C99C 47D0 8FFB 10D4 B8DA 41F4 17B4 48A6 8554 199C
47D0 F281 5B16 B815 9848 3ADA 7726 A3C4 655D 3ADA 7726 A3C4
655D
</new_public_key>
    </vector>
  </command>
  <command id=005 type=EXECUTE>calculateHealthMetrics( )
  </command>
</anp_request>
```

Once the commands have been attempted or performed the storage server may send an assisting node processing response e.g., 216 to the master server which may include a status report, a processed task confirmation and/or notice of failure. An example assisting node processing response 216, substantially in the form of an HTTP(S) POST message including XML-formatted data, is provided below:

```
POST /assisting_node_processing_response.php HTTP/1.1
Host: www.MasterServer.com
Content-Type: Application/XML
Content-Length: 667
<?XML version = "1.0" encoding = "UTF-8"?>
<anp_response>
  <timestamp>2020-12-12 09:22:43</timestamp>
  <server_ID>1023</client_ID>
  <device_credentials>
    <password>secretpass741</password>
    <private_key>k2lk39ewqiopeq697#@hnniimidrtsxbi</private_key>
  </device_credentials>
  <command_response id=001>deletion executed</command_response>
  <command_response id=002>insertion executed</command_response>
  <command_response id=003>deletion executed</command_response>
  <command_response id=004>insertion executed</command_response>
  <health_metrics>
    <CPU_temperature>39</CPU_temperature> //In Celsius
    <fan_speed> // In RPM
      <CPU>3690</CPU>
      <power_supply>3520</power_supply>
      <system_fan1>2950</system_fan1>
    </fan_speed>
    <voltage>
      <CPU>.98</CPU>
      <DDR>1.3</DDR>
      <threeV>3.41</threeV>
      <fiveV>5.02</fiveV>
      <twelveV>12.17</twelve>
    <voltage>
    <CPU_utilization>.35</CPU_utilization> //In Percent
    <memory_utilization>.26</memory_utilization>
    <disk_utilization>.23</disk_utilization>
  </health_metrics>
</anp_response>
```

In one embodiment, the BackupAggregator 204 may generate a replication file representing the differential between two snapshots represented by the BackupAggregator's underlying file system. The snapshots chosen as the endpoints for the replication file generation may not necessarily correspond to the time quantum at which the BackupAggregator receives and generates snapshots. As discussed herein, the replication file may be generated according to a backup retention requirement of a remote server, such as StorageServer_E1 206 or Master Server 205. Because of the BDR's ability to generate replication files between arbitrary locally maintained snapshot points and transfer those replication files for application to a remote snapshot file system representation, network transfer and computational requirements may be optimized. An example command for generating a replication file at BackupAggregator 204, substantially in the form of php code and shell commands is:

```
<?php
private function getBuildCommand($dataset,
                  $t0,$t1,$pvLogPath,
                  $compression) {
    $cmdZfsSend = $this->getZfsSendCommand($dataset, $t0, $t1);
    $cmdMbuffer = $this->getMbufferCommand( );
    $cmdPv = \Generic\PvLog::getBashCommand($pvLogPath);
    $cmdCompression = $this->getCompressionCommand($compression);
    $partialDeltaPath = $this->getPartialDeltaPath( );
    $sPartialDeltaPath = escapeshellarg($partialDeltaPath);
    $cmdBuild = "$cmdZfsSend | $cmdMbuffer |
                  $cmdPv $cmdCompression $sPartialDeltaPath";
    return "/bin/bash -c " . escapeshellarg(
        "$cmdBuild $sPartialDeltaPath; exit \${PIPESTATUS[0]};") .
    " 2>&1";
}
private function getZfsSendCommand(\Speedsync\Dataset $dataset,
                  $t0, $t1) {
    $zfs = \Speedsync\run($this->log, 'which zfs');
    $zfsPath = $dataset->getZfsPath( );
    // Base image sendfile
    if ($t0 === 0) {
        return "$zfs send $zfsPath@$t1";
    }
    // Incremental sendfile (e.g., replication file) generation
    return "$zfs send -i $t0 $zfsPath@$t1";
}
private function getMbufferCommand( ) {
    return 'mbuffer -m 128M -s 128k -v 0 -q';
}
private function getCompressionCommand($type) {
    if ($type === 'gz') {
        $cmdGz = \Speedsync\run($this->log, 'which pigz');
        return "| $cmdGz >";
    }
    // Uncompressed (raw data)
    return '>';
}
```

In one embodiment, the BackupAggregator 204 may start a port forwarding or TCP/IP connection tunneling (e.g., secure shell session) e.g., 221 with the storage server 206 to transfer a replication file. Thereafter, backup files may be replicated to synchronize the BackupAggregator and the storage server while minimizing data transfers. In one embodiment, the mechanism to start a port forwarding connection and synchronization process e.g., 221 may be implemented substantially in the form of php code and shell commands as presented below:

```
$BDRSyncCmd = $this->BDRSyncCmdGen($sourcePath,
        $targetAddress,
        $knownHostsPath,
        $destinationPath,
        $BDRSyncLogPath);
```

-continued

```
$bashCmd = "/bin/bash -c '$BDRSyncCmd; exit \${PIPESTATUS[0]};'";
exec($bashCmd, $out, $exitCode);
private function BDRSyncCmdGen($source, $targetAddress,
$knownHostsPath, $destination, $BDRSyncLogPath) {
        // Rsync executable embodiment
        $rsync = run("which sync4", false);
        if ($rsync === '') {
                $rsync = "/usr/bin/sync4";
                run("ln /usr/bin/rsync $rsync");
        }
        $sshCmd = $this->sshCommand($knownHostsPath);
        if (Host::isDevice( )) {
                $user = run("/datto/scripts/secretKey.sh");
        }
        else {
                $user = "interserver";
        }
        return "$rsync -Pv --inplace -e \"$sshCmd\"
2>/dev/null $source $user@$targetAddress:$destination | tee
$BDRSyncLogPath 1>&2";
}
private function sshCommand($knownHostsPath) {
        if (Host::isDattoCloud( )) {
                $keyFile = '-i ' .
escapeshellarg('/interserver/.ssh/serverKey_dsa') . ' ';
        }
        else {
                $keyFile = '';
        }
        return "ssh $keyFile " .
        "-c arcfour128 " .
        "-o StrictHostKeyChecking=yes " .
        "-o UserKnownHostsFile=$knownHostsPath " .
        "-o PasswordAuthentication=no " .
        "-o ServerAliveInterval=15 " .
        "-o ServerAliveCountMax=8";}
```

Concurrently, the BackupAggregator may start a polling process e.g., 222 which may continuously check the storage server for a notification message indicating that the synchronization process has been completed. In an alternative embodiment, the polling process may be directed to the master server 205 which will be responsible of sending the notification message. Once the completion message has been emitted by the storage server the BackupAggregator may bring the tunneling session to an end. By utilizing a separate polling process to monitor the synchronization process allows the BDR to utilize a regularly updating file transfer path (e.g., secured via automatically rotating SSH keys) while allowing the polling of an individual transfer to proceed over a channel secured via a different mechanism. Such a separation additionally allows the BDR to monitor aspects of performance related to a synchronization command and thereafter adjust or modify task priorities as a result of the observed performance of otherwise lower level transfer commands utilized in some synchronization embodiments of the BDR. In one embodiment, the mechanism to perform the polling process may be implemented substantially in the form of PHP code as presented below:

```
<?php
class Target {
    public function ping( ) {
        $data = array('ping');
        $this->send($data);
    }
    private function send($data) {
        $response = $this->transport->send($data);
        $result = @$response['result'];
        $messages = @$response['messages'];
```

```
        $this->readMessages($messages);
        return $result;
    }
    private function readMessages($messages) {
        foreach ($messages as $arguments) {
            //process inbound messages
        }
    }
}
//example commands that may be sent along with
//or in addition to ping
protected function cmdSetDatasetUsedSize($secondaryName,
                                         $universal, $size) {
    $send = Send::getSend($secondaryName, $universal);
    $send->setRemoteDatasetUsedSizeCached($size);
}
protected function cmdSetDatasetReferSize($secondaryName,
                                          $universal, $size) {
    $send = Send::getSend($secondaryName, $universal);
    $send->setRemoteDatasetReferSizeCached($size);
}
}
//sendfile transfer completion polling
$target = new Target($secondaryMachine, $host, $log);
$target->ping( );
```

In one embodiment, the storage server 206 may start a port forwarding or TCP/IP connection tunneling (e.g. secure shell session) e.g., 220 with the storage server 207. Thereafter, backup files may be synchronized from the storage server 206 to the storage server 207 while minimizing data transfers. An example of a mechanism to start a port forwarding connection and synchronization process has been already substantially shown in this specification e.g., 221. Concurrently, the storage server 206 may start a polling process e.g., 218 which will continuously check the storage server 207 for a message indicating that the synchronization process has been completed. Once the completion message has been emitted by the storage server 207 the storage server 206 may bring the tunneling session to an end.

FIG. 3 shows an example data flow illustrating aspects of management of data replication and storage system reconfiguration, in one implementation of the BDR operation. In one embodiment, the BackupAggregator 325 may periodically revise a backup and snapshot schedule e.g., 302. An example backup and snapshot schedule 302, substantially in the form of XML-formatted data, is provided below:

```
<?XML version = "1.0" encoding = "UTF-8"?>
<local_backup_schedule>
   <backup id=001>
      <last_backup>2020-04-16 06:30:00</last_backup>
      <next_backup>2020-04-16 10:30:00</last_backup>
      <interval units=hour>4</interval>
      <dataset>012</dataset>
   </backup>
    <backup id=002>
      <last_backup>2020-04-16 09:00:00</last_backup>
      <next_backup>2020-04-18 09:00:00</last_backup>
      <interval units=days>2</interval>
      <dataset>037</dataset>
   </backup>
   <backup id=003>
      <last_backup>2020-04-16 15:20:00</last_backup>
      <next_backup>2020-04-18 15:30:00</last_backup>
      <interval units=minutes>10</interval>
      <dataset>023</dataset>
   </backup>
</local_backup_schedule>
```

In one embodiment, the BackupAggregator may send a backup request e.g., 301 to a server e.g., 320. The server may receive the backup request and consequently may send a backup response e.g., 313. In one embodiment, the BackupAggregator may receive the backup response and afterward take a snapshot of the backup image file e.g., 303. Thereafter, the BackupAggregator may determine if the snapshot should be replicated to a remote storage server utilizing a remote backup schedule e.g., 304. An example remote backup schedule e.g., 304, substantially in the form of XML-formatted data, is provided below:

```
<?XML version = "1.0" encoding = "UTF-8"?>
<remote_backup_schedule>
   <backup id=001>
      <last_backup>2020-04-17 23:00:00</last_backup>
      <next_backup>2020-04-24 23:00:00</last_backup>
      <interval units=week>1</interval>
      <vector>0016</vector>
   </backup>
   <backup id=002>
      <last_backup>2020-04-15 09:00:00</last_backup>
      <next_backup>2020-04-30 09:00:00</last_backup>
      <interval units=days>15</interval>
      <vector>0058</vector>
   </backup>
   <backup id=003>
      <last_backup>2020-04-16 23:00:00</last_backup>
      <next_backup>2020-05-16 23:00:00</last_backup>
      <interval units=month>1</interval>
      <vector>0115</vector>
   </backup>
</remote_backup_schedule>
```

In one embodiment, the BackupAggregator may perform backups, replication and restoration tasks following a prioritization order. For example the system may prioritize the transfer of certain type of files regardless from which device they have been received and/or may prioritize the transfer of files related to a specific machine depending on what it is deemed as critical and/or necessary data. Furthermore, a second level of prioritization that conditionally favors certain tasks depending on the type of action they comprise may be utilized. For example a priority order may be determined where tasks that specify a building file action have precedence over tasks that specify a streaming action. Similarly a task that specify a sending action may have precedence over tasks specifying building actions; lastly, tasks specifying a receiving action may have precedence over tasks specifying a sending action and therefore all other type of tasks (i.e., building and streaming). Further details with respect to prioritization assignment enforcement, e.g., 305 are described herein and particularly with respect to an example PAE Component e.g., FIG. 4). The aforementioned prioritization order it is just an example of many orders that may be handled by a BackupAggregator and other BDR devices. In other embodiments, the prioritization order may be configured based on the availability of resources for example a bandwidth-conserving prioritization technique may comprise sending BDR related data packets at a time when a network experiences less traffic. Additionally other prioritization orders may overcome obstacles occurring in a node (e.g., a disk has reached its maximum capacity) by routing around datapackets and the like techniques.

In one embodiment, the BackupAggregator may send a task processing assistance request e.g., 307 to a master server e.g., 323. A task processing assistance request may be triggered periodically (e.g. every minute) and/or in response to determined events e.g., a failing to connect with a remote storage server. An example of a task processing assistance request in one embodiment of the BDR has been already substantially shown in this specification e.g., 212.

In one embodiment, a master server e.g., 323 may receive a task processing assistance request from a BackupAggregator. Thereafter, the master server may perform a validity check of the task processing assistance request, retrieve task required objects which depending on the requester (i.e., BackupAggregator) may be one or more commands that may need to be executed and/or reconfiguration related tasks, the outcome of such commands will be included in a task processing assistance response e.g., 308 which may be sent to the requester at a later time. Further details with respect to the validation, retrieval and generation of the assistance response, e.g., 316 are described herein and particularly with respect to an example VRG Component e.g., FIG. 6)

In one embodiment, a master server e.g., 323 may send an assisting node processing request e.g., 318 to a storage server e.g., 324. An assisting node processing request may be triggered periodically (e.g., every 10 min) and/or in response to determined events e.g., a reconfiguration of the BDR system. In one embodiment, an assistance node processing request may specify commands that are required to be performed by the storage server including but not limited to calculating how much disk space is available in the storage server, updating software e.g., file system software, logical volume manager software and the like. An example of an assisting node processing request in one embodiment of the BDR has been already substantially shown in this specification e.g., 215. Once the commands have been performed or attempted the storage server may send an assisting node processing response e.g., 319 to the master server which may include a status report, a processed task confirmation and/or notice of failure. An example of an assisting node processing response in one embodiment of the BDR has been already substantially shown in this specification e.g., 216.

In one embodiment a Network Administrator e.g., 322 in communication with the Administrator Device 321 may send a command to the master server 323 to configure the BDR network model e.g., 314. Thereafter, the master server may reconfigure the network's model and propagate the changes to the affected nodes. Further details with respect to the processing of a reconfiguration command e.g., 315 are described herein and particularly with respect to an example RP component e.g., FIG. 7.

In one embodiment, the master server 323 may send an assisting node reconfiguration request e.g., 317 to the storage server 324. The assisting node reconfiguration request may indicate to the storage server that the synchronization from an specific BackupAggregator e.g., 325 may no longer be authorized. Consequently the storage server may deactivate its corresponding authentication mechanisms (e.g., ssh keys) employed by the BackupAggregator to establish a connection tunneling to synchronize files. An example assisting node reconfiguration request e.g., 317, substantially in the form of an HTTP(S) POST message including XML-formatted data, is provided below:

```
POST /assisting_node_reconfiguration_request.php HTTP/1.1
Host: www.StorageServer.com
Content-Type: Application/XML
Content-Length: 667
<?XML version = "1.0" encoding = "UTF-8"?>
<anrr_request>
  <timestamp>2020-12-12 17:22:43</timestamp>
  <device_ID>2504</device_ID>
  <device_credentials>
    <password>masterSecretPass1732</password>
```

-continued

```
    <private_key>g3269ewpiwnhe456#@onqaimidrtskhe</private_key>
  </device_credentials>
  <request ID=001>
    <command ID=001 type=DELETE>
      <public_key key_format=RSA genTime=14:55:00> 0479 BE66
7EF9 ECBB AC55 A062 95CE 870B 0702 9BFC DB2D CE28 D959
F281 5B16 F817 9848 3ADA 7726 A3C4 655D A4FB FC0E 1108
A8FD 17B4 48A6 8554 199C 47D0 8FFB 10D4 B8DA 41F4 23FA
A25E 012B <public_key>
    </command>
//optional
<command id=002>calculateHealthMetrics( )</command>
</anrr_request>
```

In one embodiment, the BackupAggregator 325 may send a port forwarding for file transfer session request to the storage server e.g., 310. Thereafter, the storage server 324 may process the request and may send a port forwarding for file transfer session response which may contain an ssh connection failure message e.g., 311 if the connection was denied because the BackupAggregator does not have an adequate authentication credential (e.g., ssh key) otherwise the connection may be established. Thereafter, in the case of a connection failure, the BackupAggregator may send a task processing assistance request e.g., 306 to the master server 323 to verify if synchronization to the storage server 324 is still expected. An example of a task processing assistance request in one embodiment of the BDR has been already substantially shown in this specification e.g., 212. In one embodiment, the master server may validate the task, retrieve the task required objects and generate an assistance response e.g., 316 utilizing a VRG Component e.g., FIG. 6 and may send an assisting node reconfiguration request e.g., 309 back to the BackupAggregator.

In one embodiment, the BackupAggregator 325 may receive an assisting node reconfiguration request e.g., 309 indicating to delete a no longer valid mirroring relationship and add a new mirroring relationship. Thereafter the BackupAggregator may execute the specified commands and may delete authentication credentials to connect to the storage server 324 (e.g., 312) and may generate authentication credentials to connect to a different storage server as specified by the commands. An example assisting node reconfiguration request e.g., 309, substantially in the form of an HTTP(S) POST message including XML-formatted data, is provided below:

```
POST /assisting_node_reconfiguration_request.php HTTP/1.1
Host: www.BackupAggregator.com
Content-Type: Application/XML
Content-Length: 667
<?XML version = "1.0" encoding = "UTF-8"?>
<anrr_request>
  <timestamp>2020-12-12 18:22:43</timestamp>
  <device_ID>8905</device_ID>
  <device_credentials>
    <password>masterSecretPass17</password>
    <private_key>k769ewpiwnhe456#@onqaimidrtskhe</private_key>
  </device_credentials>
  <request ID=001>
    <command ID=001 type=DELETE>
      <primary>0177</primary>
      <secondary>0081</secondary>
      <dataset>0747</dataset>
    </command> /*command 001 deletes a mirroring relationship
wherein BackupAggregator's ID is 0177, the StorageServer_E1 ID is
0081 and the dataset 0747 corresponds to Server1 in Fig. 3*/
    <command ID=002 type=INSERT>
      <primary>0177</primary>
```

-continued

```
        <secondary>0071</secondary>
        <dataset>0747</dataset>
      </command>/*command 002 establishes a mirroring relationship
between the Server1 and a storage server with ID 0071 for a
dataset corresponding to Server1 in Fig. 3*/
    </request>
</anrr_request>
```

In an alternative example the assisting node reconfiguration request e.g., 309, can also be implemented substantially in the form of an HTTP(S) POST message including XML-formatted data, as provided below:

```
POST /assisting_node_reconfiguration_request.php HTTP/1.1
Host: www.BackupAggregator.com
Content-Type: Application/XML
Content-Length: 667
<?XML version = "1.0" encoding = "UTF-8"?>
<anrr_request>
    <timestamp>2020-12-12 18:22:43</timestamp>
    <device_ID>8905</device_ID>
    <device_credentials>
        <password>masterSecretPass17</password>
        <private_key>k769ewpiwnhe456#@onqaimidrtskhe</private_key>
    </device_credentials>
    <request ID=001>
      <command ID=001>'DELETE FROM "vectors" WHERE
            ("primary" = 0177) AND ("secondary" = 0081) AND
            ("dataset" = 0747)'
      </command> /*command 001 deletes a mirroring relationship
wherein BackupAggregator's ID is 0177, the StorageServer_E1 ID is
0081 and the dataset 0747 corresponds to Server1 in Fig. 3*/
        <command ID=002>'INSERT OR IGNORE INTO "vectors"
            ("primary", "secondary", "dataset") VALUES
            (0177,   0071,   0747) '
        </command>/*command 002 establishes a mirroring relationship
between the Server1 and a storage server with ID 0071 for a
dataset corresponding to Server1 in Fig. 3*/
    </request>
</anrr_request>
```

FIG. 4 shows an example logic flow illustrating aspects of prioritization assignment enforcement component, e.g., PAE Component, in one embodiment of the BDR operation. In one embodiment, a storage device may retrieve an array of tasks e.g., tArray containing the tasks that are pending to be executed e.g., 401. Thereafter, the storage device may determine the number of slots available to perform file system and volume manager operations (e.g., receive, build, stream, send and the like) and/or the number of slots available to perform transfer operations (e.g., send, stream and the like) e.g., 402. If the available zfs slots are greater than zero or the available transfer slots are greater than zero e.g., 403 then tArray is sorted; first according to a predefined dataset priority order and then according to the types of actions each task comprise e.g., 404. For example the actions may be sorted according to the order 1st-receive, 2nd-send, 3rd-building and 4th-streaming actions. The number of zfs and transfer slots may be defined based on the system processing capacity. Alternatively, other conditional variables which may result in optimal CPU performance or other optimization metric may also be employed. If the number of zfs slots and the number of transfer slots is less than zero then process may stop e.g., 403.

In one embodiment, a task is extracted from the tArray e.g., 405. If the number of zfs slots is greater than zero and the task is of a ZFS type e.g., 406 then the number of zfs slots is decreased by one unit e.g., 407 and the current task is executed e.g. 408. If the number of zfs slots is not greater than zero or the task is not of a ZFS type e.g., 406 then condition 409 is evaluated. If the number of transfer slots is greater than zero and if the task is of a transfer type e.g., 409 then, the number of transfer slots is decreased by one unit e.g., 410 and the current task is executed e.g., 411. Alternatively, if the number of transfer slots is not greater than zero or the task is not of a transfer type e.g., 409 and after the execution of a current task (e.g., 408 and 411) then the available slots are evaluated e.g., 412. If the number of zfs slots is not greater than zero and the number of transfer slots is not greater than zero then the process may stop e.g., 412. If the number of zfs slots is greater zero or the number of transfer slots is greater than zero e.g., 412 then, it is verified if the current task is the last task in the tArray e.g., 413. If the current task is the last task in the tArray then the process may stop. However, if the current task is not the last task in the tArray then the next task is extracted from the tArray e.g., 405 and the subsequent steps are repeated one more time.

FIG. 5 shows an example logic flow illustrating aspects of the BDR client image handler, e.g., CIH Component, in one implementation of the BDR operation. In one embodiment, server 509 may send a PeriodicServerBackup (PSB) packet e.g., 501 to the BackupAggregator 510. The BackupAggregator receives the packet and may extract the client ID (CID) from the PSB packet e.g., 502. Thereafter, a cached list of incoming links is verified to determine if the extracted cliend ID corresponds to an authorized incoming link e.g., 503. If the client ID is a valid link e.g., 504 then, a sparse disk image (CID_IMG) is extracted from the PSB packet e.g., 506 and a copy of the disk image is added to the BackupAggregator's storage pool e.g., 507. In another embodiment, if the client ID is a valid link e.g., 504 then, a disk image is extracted from the PSB packet e.g., 506 and processed such that when the disk image contains multiple empty memory blocks or memory blocks containing repetitive data those blocks are abbreviated or compressed to reduce the storage space required by the disk image. Thereafter, a BackupAggregator Backup Response may be sent to the server e.g., 508. If the client ID does not correspond to a valid link e.g., 504 then, the BackupAggregator may eliminate the PSB packet and may execute corrective measures to eradicate further packets from the client CID e.g., 505. Thereafter, a BackupAggregator Backup Response may be sent to the server e.g., 508.

FIG. 6 shows an example logic flow illustrating aspects of the BDR validation, retrieval and assistance generation response, e.g., VRG Component in one implementation of the BDR operation. In one embodiment, the BackupAggregator 612 may send a task processing assistance request (TPAR) e.g., 601 to the MasterServer 613. The MasterServer receives the TPAR request and may extract a vector VEC from the request packet e.g., 602. The term vector as adopted herein is used to describe a mirroring relationship between a source and a destination node, the nodes in such relationships may include, but not limited to, a cellular telephone (smart phone), a personal digital assistant ("PDA"), a tablet computer, a laptop, a personal computer, a virtual machine, a network appliance, a network attached storage device, a hard drive, an optical drive, a tape drive, or any other computing device or storage device configured for network communications. Moreover, a vector may also describe a relationship between more than one node wherein the additional nodes may serve as means to transport backup files to a cloud gateway and thereafter to the final destination storage node. In one embodiment, if the vector VEC is listed in the MasterServer repository e.g., 603 then, a TPAR_Response packet is generated acknowledging the vector VEC e.g., 610 and the MasterServer sends the TPAR_Response to the BackupAggregator e.g., 611. If the vector VEC is not listed in the MasterServer repository e.g., 603 then, the condition 604 is verified. If the vector VEC is listed in the MasterServer services e.g., 604 then, the vector VEC is inserted into the MasterServer repository e.g., 605 a TPAR_Response packet is generated acknowledging the vector VEC e.g., 610 and the MasterServer sends the TPAR_Response to the BackupAggregator e.g., 611. If the vector VEC is not listed in the MasterServer services e.g., 604 then, a command to remove vector VEC from the BackupAggregator repository is included in the TPAR_Response e.g., 606 and the MasterServer sends the TPAR_Response to the BackupAggregator e.g., 611.

In another embodiment, the MasterServer 613 may send periodically or triggered by a BDR system event, an assisting node processing request e.g., 607 to the StorageServer 614. The StorageServer 614 receives the processing request and may reset the SSH keys employed by the BackupAggregator 612 to communicate with the StorageServer e.g., 608. Thereafter, the StorageServer may send an assisting node processing response acknowledging the performed operation to the MasterServer e.g., 609.

Figure 7:
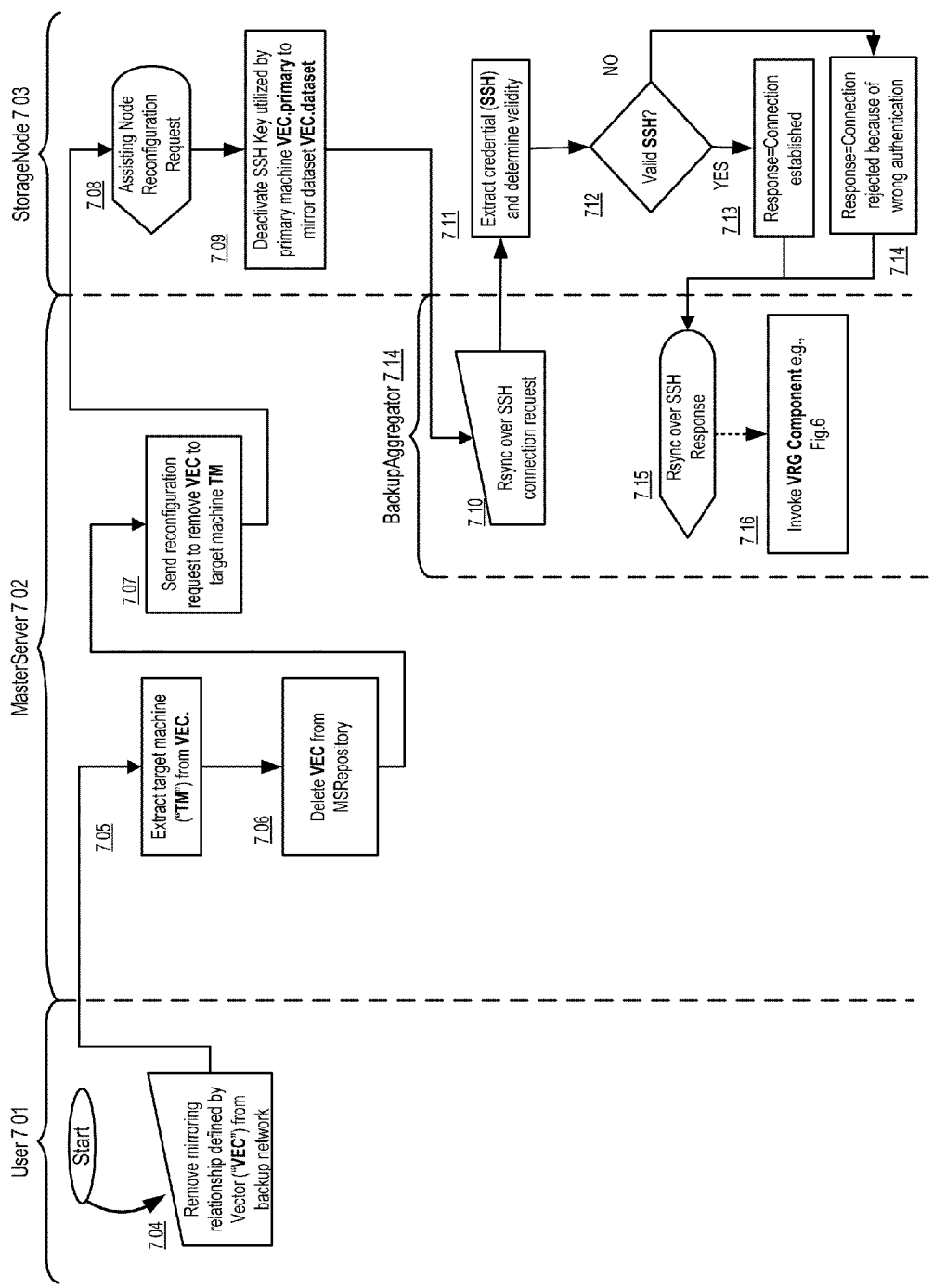
FIG. 7 shows an example logic flow illustrating aspects of the BDR network model reconfiguration and propagation of changes, e.g., RP Component in one implementation of the BDR operation.

FIG. 7 shows an example logic flow illustrating aspects of the BDR network model reconfiguration and propagation of changes, e.g., RP Component in one implementation of the BDR operation. In one embodiment, the User 701 may enter a command to remove a mirror relationship defined by vector VEC from a backup network e.g., 704. The MasterServer 702 receives the configuration commands and may extract and identifier (TM) of the affected target machine (i.e., the machine which receives the replicated files) e.g., 705. Thereafter, the MasterServer may delete the vector VEC from its local repository e.g., 706. In one embodiment, the MasterServer may send a reconfiguration request to remove vector VEC from the TM machine's repository e.g., 707.

In another embodiment, the StorageNode 703 receives an assisting node reconfiguration request containing vector VEC e.g., 708. Thereafter, the StorageNode may deactivate the SSH key utilized by the vector's primary machine to mirror a dataset to the StorageNode e.g., 709.

In another embodiment, the BackupAggregator 714 may send a request to establish a tunneling connection and perform file synchronization with the StorageNode e.g., 710. Thereafter, the StorageNode may receive the request and while processing the request may determine that the authentication credentials employed by the BackupAggregator are not valid e.g., 711. In consequence, the StorageNode may extract the credentials (SSH) sent by the BackupAggregator and verify its validity e.g., 711. If the SSH key is valid e.g., 712 then the response is "Connection established" e.g., 713. If the SSH key is not valid e.g., 712 the response is "Connection rejected because of wrong authentication". In another embodiment the BackupAggregator 714 may receive a Rsync over SSH Response which can acknowledge an SSH connection or may informed a connection failure e.g., 715. When a connection failure is reported back then, the BackupAggregator may invoke the BDR's VRG Component e.g., 716.

BDR Controller

Figure 8:
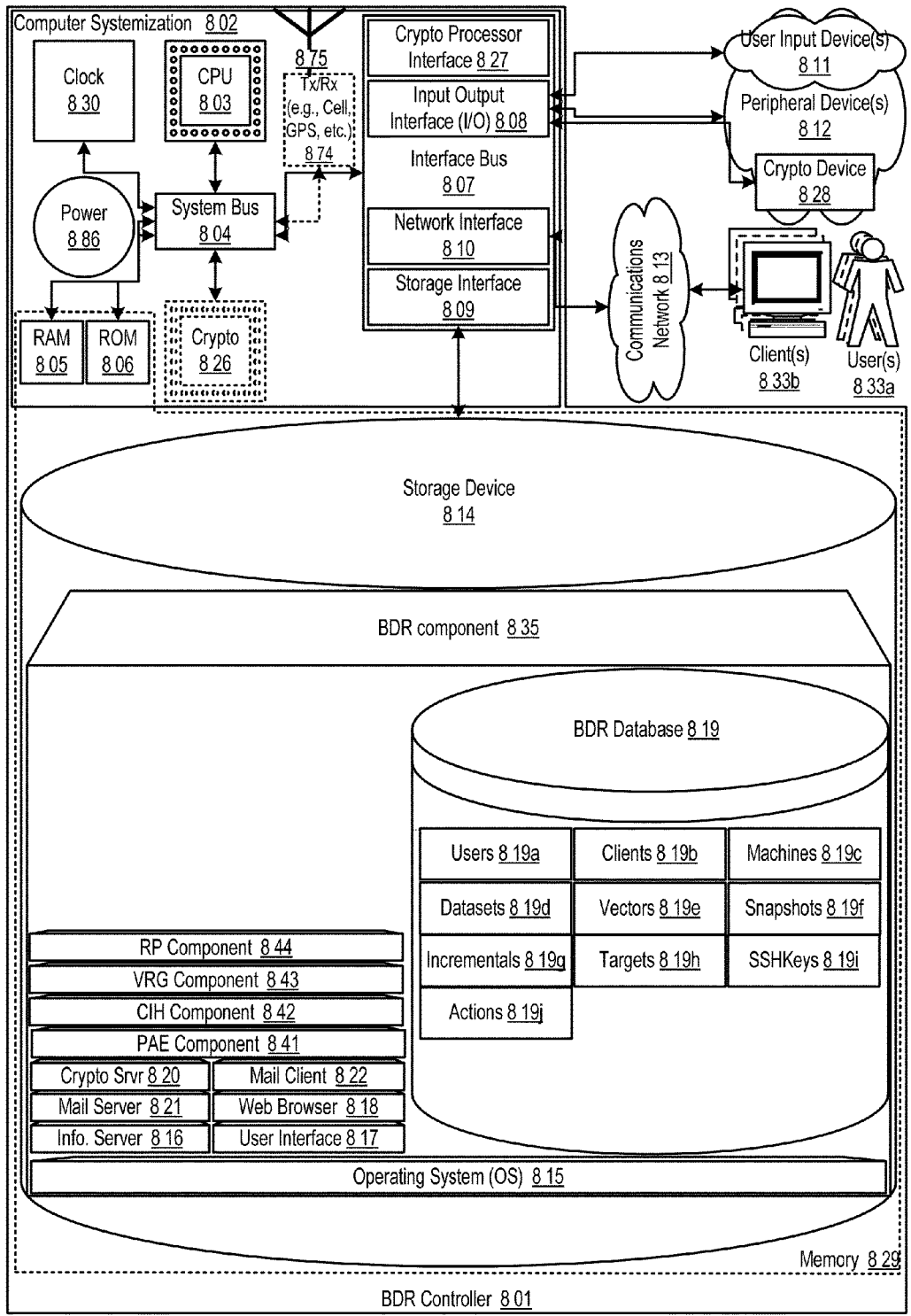
FIG. 8 shows a block diagram illustrating aspects of an exemplary embodiment of a BDR user interface controller, in one implementation of the BDR operation.

FIG. 8 shows a block diagram illustrating embodiments of a BDR controller. In this embodiment, the BDR controller 801 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the BDR controller 801 may be connected to and/or communicate with entities such as, but not limited to: one or more users from user input devices 811; peripheral devices 812; an optional cryptographic processor device 828; and/or a communications network 813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The BDR controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)" (these terms are used interchangeably throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effectuate communications, operations, storage, etc. The computer systemization may be connected to a power source 886; e.g., optionally the power source may be internal. Optionally, a cryptographic processor 826 and/or transceivers (e.g., ICs) 874 may be connected to the system bus. In another embodiment, the cryptographic processor and/or transceivers may be connected as either internal and/or external peripheral devices 812 via the interface bus I/O. In turn, the transceivers may be connected to antenna(s) 875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing BDR controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the BDR controller and beyond through various interfaces. Should processing requirements dictate a greater amount speed and/or capacity, distributed processors (e.g., Distributed BDR), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the BDR may be achieved by implementing a microcontroller such as CAST's R8051XC2 microcontroller; Intel's MCS 51 (i.e., 8051 microcontroller); and/or the like. Also, to implement certain features of the BDR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the BDR component collection (distributed or otherwise) and/or features may be implemented via the microprocessor and/or via embedded components; e.g., via ASIC, coprocessor, DSP, FPGA, and/or the like. Alternately, some implementations of the BDR may be implemented with embedded components that are configured and used to achieve a variety of features or signal processing.

Depending on the particular implementation, the embedded components may include software solutions, hardware solutions, and/or some combination of both hardware/software solutions. For example, BDR features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the BDR features. A hierarchy of programmable interconnects allow logic blocks to be interconnected as needed by the BDR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the BDR may be developed on regular FPGAs and then migrated into a fixed version that more resembles ASIC implementations. Alternate or coordinating implementations may migrate BDR controller features to a final ASIC instead of or in addition to FPGAs. Depending on the implementation all of the aforementioned embedded components and microprocessors may be considered the "CPU" and/or "processor" for the BDR.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the BDR thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the BDR controller is accessible through remote clients 833*b* (e.g., computers with web browsers) by users 833*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed BDR), architectures may similarly be employed to pool, load balance, and/or otherwise increase the communicative bandwidth required by the BDR controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 811 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 812 may be connected and/or communicate to I/O and/or other facilities of the like such as network interfaces, storage interfaces, directly to the interface bus, system bus, the CPU, and/or the like. Peripheral devices may be external, internal and/or part of the BDR controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the BDR controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the BDR controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the BDR controller and/or a computer systemization may employ various forms of memory 829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the BDR component(s) 835; PAE component 841, CIH component 842, VRG component 843, RP component 844; and/or the like (i.e., collectively a component collection). These components may be stored and accessed from the storage devices and/or from storage devices accessible through an interface bus. Although non-conventional program components such as those in the component collection, typically, are stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the BDR controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the BDR controller to communicate with other entities through a communications network 813. Various communication protocols may be used by the BDR controller as a subcarrier transport mechanism for interaction, such as, but not limited to: multicast, TCP/IP, UDP, unicast, and/or the like.

Information Server

An information server component 816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the BDR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the BDR database 819, operating systems, other program components, user interfaces, Web browsers, and/or the like.

Access to the BDR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the BDR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the BDR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the BDR enabled nodes. The combined application may be nugatory on systems employing standard Web browsers.

Mail Server

A mail server component 821 is a stored program component that is executed by a CPU 803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the BDR.

Access to the BDR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the BDR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the BDR component to engage in secure transactions if so desired. The cryptographic component facilitates the secure accessing of resources on the BDR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The BDR Database

The BDR database component 819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the BDR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the BDR database is implemented as a data-structure, the use of the BDR database 819 may be integrated into another component such as the BDR component 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 819*a-j*. A Users table 819*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a BDR. A Clients table 819*b* may include fields such as, but not limited to: client_id, client_name, client_ip, client_type, client_model, operating_system, os_version, app_installed_flag, and/or the like. A Machines table may support and/or track multiple entity accounts on a BDR. A Machines table 819*c* may include fields such as, but not limited to: machine_id, machine_type, machine_index and/or the like. A Dataset table 819*d* may include fields such as, but not limited to: ds_id, ds_origin, ds_type, ds_name and/or the like. A Vectors table 819*e* may include fields such as, but not limited to: vec_id, vec_primaryMachine, vec_secondaryMachine, vec_dataset and/or the like. A Snapshots table 819*f* may include fields such as, but not limited to: snp_machine, snp_dataset, snp_timeStamp, and/or the like. An Incrementals table 819*g* may include fields such as, but not limited to: inc_machine, inc_dataset, inc_timeStamp0, inc_timeStamp1, inc_path, and/or the like. A Targets table 819*h* may include fields such as, but not limited to: tgt_deviceID, tgt_primaryServerID, tgt_secondaryServerID, and/or the like. A SSHkeys table 819*i* may include fields such as, but not limited to: ssh_machine, ssh_address, ssh_key, and/or the like. An Actions table 819*j* may include fields such as, but not limited to: act_id, act_action, act_machine, act_dataset, act_timeStamp0, act_timeStamp1, act_state, act_pid, and/or the like.

In one embodiment, the BDR database may interact with other database systems. For example, employing a distributed database system, queries and data access by search BDR component may treat the combination of the BDR database, an integrated data security layer database as a single database entity.

In one embodiment, user programs may contain various user interface primitives, which may serve to update the BDR. Also, various accounts may require custom database tables depending upon the environments and the types of clients the BDR may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819*a-j*. The BDR may be configured to keep track of various settings, inputs, and parameters via database controllers.

The BDR database may communicate to and/or with other components in a component collection, including itself, and/or facilities of the like. Most frequently, the BDR database communicates with the BDR component, other program components, and/or the like. The database may contain, retain, and provide information regarding other nodes and data.

The BDRs

The BDR component 835 is a stored program component that is executed by a CPU. In one embodiment, the BDR component incorporates any and/or all combinations of the aspects of the BDR that was discussed in the previous figures. As such, the BDR affects accessing, obtaining and the provision of information, services, transactions, and/or the like across various communications networks. The features and embodiments of the BDR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the BDR's features and facilities, and in many cases reduce the costs, energy consumption/requirements, and extend the life of BDR's underlying infrastructure; this has the added benefit of making the BDR more reliable. Similarly, many of the features and mechanisms are designed to be easier for users to use and access, thereby broadening the audience that may enjoy/employ and exploit the feature sets of the BDR; such ease of use also helps to increase the reliability of the BDR. In addition, the feature sets include heightened security as noted via the Cryptographic components 820, 826, 828 and throughout, making access to the features and data more reliable and secure.

The BDR component may transform machine datasets into replications and redundant ready-to-use backup files, and/or the like and use the BDR. In one embodiment, the BDR component 835 takes inputs (e.g., configure backup agent 210, periodic backup server 202, task processing assistance request 212, assisting node processing request 215, port forwarding for file transfer session 220 and 221, backup request 301, task processing assistance request 306 and 307, assisting node processing request 318, assisting node reconfiguration request 317 and 309, port forwarding for file transfer session 310, BDR network reconfiguration 314, and/or the like) etc., and transforms the inputs via various components (e.g., PAE Component 841, CIH Component 842, VRG Component 843, RP Component 844; and/or the like), into outputs (e.g., periodic server backup response 223, task processing assistance response 213, assisting node processing response 216, backup response 313, task processing assistance response 308, assisting node processing response 319, port forwarding for file transfer session response 311, and/or the like).

The BDR component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the BDR server employs a cryptographic server to encrypt and decrypt communications. The BDR component may communicate to and/or with other components in a component collection, including itself, and/or facilities of the like. Most frequently, the BDR component communicates with the BDR database, operating systems, other program components, and/or the like. The BDR may contain, communicate, generate, obtain, and/or provide program component, system, user, and/or data communications, requests, and/or responses.

Distributed BDRs

The structure and/or operation of any of the BDR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the BDR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the BDR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port = 255;
//create a server-side SSL socket, listen
//for/accept incoming communication
$sock = socket_create(AF_INET, SOCK_STREAM, 0);
socket_bind($sock, $address, $port)
    or die('Could not bind to address');
socket_listen($sock);
$client = socket_accept($sock);
//read input data from client device in 1024 byte
//blocks until end of message
do {
        $input = "";
        $input = socket_read($client, 1024);
        $data .= $input;
} while($input != "");
// parse data to extract variables
$obj = json_decode($data, true);
// store input data in a database
mysql_connect("10.1.1.1",$srvr,$pass); // access database server
mysql_select("CLIENT_DB.SQL"); // select database to append
mysql_query("INSERT INTO UserTable (transmission) VALUES
($data)"); // add data to UserTable table in  a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Other embodiments of the BDR may include:

1. A processor implemented system for managing the replication and storage of data sets comprising:
   means to send a backup request according to a backup and snapshot schedule;
   means to receive at a host of a first file system a backup response comprising image enabled backup data reflecting the state and content of a computer device;
   means to capture a snapshot of the image enabled backup data, and storing the snapshot in the first file system;
   means to validate according to a remote backup schedule a vector comprising a data set indicator corresponding to the computer device, and a mirroring relationship between the first file system and a second file system;
   means to send a task processing assistance request to a master server comprising a vector identifier, wherein the task processing assistance request is sent according to a first prioritization order comprising a user's defined prioritized replication order and a second prioritization order comprising a prioritized actions' execution order; and
   means to synchronize the first file system with the second file system only after receiving a task processing assistance response from the master server validating the mirroring relationship.

2. The system of embodiment 1, wherein the said received image enabled backup data is selected from the group consisting of full backup data, differential backup data and incremental backup data.

3. The system of embodiment 1, wherein the image enabled backup data is stored in the first file system and the captured snapshot is associated with the time when the image enabled backup data was generated.

4. The system of embodiment 1, wherein the captured snapshot comprises an incremental relation mirroring data blocks that have been modified in the computer system from the time when a previously received image enabled backup data was generated to the time when the current image enabled backup data was generated, and associating the snapshot with the time when the current image enabled backup data was generated.

5. The system of embodiment 4, wherein each snapshot can serve as a restore point for the computer device corresponding to its associated time;

6. The system of embodiment 4, further comprising means to generate a rapid recovery file in a ready-to-run disk image format corresponding to the image enabled backup data received by the host of the first file system in the current backup response and storing the rapid recovery file in the first file system.

7. The system of embodiment 6, wherein the first and second file system can be synchronized at a different frequency than the frequency on which the backup responses are received by the host of the first file system.

8. The system of embodiment 5, wherein the host of the first file system is different from a host of the second file system.

9. The system of embodiment 8, wherein the task processing assistance request further comprises at least one new cryptographic key generated by the host of the first file system and a plurality of metrics related to the operational state of the host of the first file system.

10. The system of embodiment 9, further comprising a step wherein said master server sends an assisting node processing request to the host of the second file system comprising at least one new cryptographic key generated by the host of the first file system.

11. The system of embodiment 10, further comprising a step wherein said master server receives an assisting node processing response comprising a plurality of metrics related to the operational state of the host of the second file system.

12. The system of embodiment 11, further comprising a step wherein said master server receives a network reconfiguration request comprising a command to delete a vector describing a relation between the first file system and the second file system.

13. The system of embodiment 12, further comprising a step wherein said master server sends an assisting node reconfiguration request to the host of the second file system comprising at least one command to disable at least one cryptographic key corresponding to the host of the first file system.

14. The system of embodiment 13, wherein a synchronization request generated by the host of the first file system is declined by the host of the second file system.

15. The system of embodiment 14, further comprising a step wherein said master server sends an assisting node reconfiguration request to the host of the first file system comprising at least one command to delete a vector from a remote backup schedule.

16. The system of embodiment 3, wherein each snapshot can serve as a restore point for the computer device corresponding to its associated time;

17. The system of embodiment 3, further comprising means to generate a rapid recovery file in a ready-to-run disk image format corresponding to the image enabled backup data received by the host of the first file system in the current backup response and storing the rapid recovery file in the first file system.

18. The system of embodiment 17, wherein the first and second file system can be synchronized at a different frequency than the frequency on which the backup responses are received by the host of the first file system.

19. The system of embodiment 16, wherein the host of the first file system is different from a host of the second file system.

20. The system of embodiment 19, wherein the task processing assistance request further comprises at least one new cryptographic key generated by the host of the first file system and a plurality of metrics related to the operational state of the host of the first file system.

21. The system of embodiment 20, further comprising a step wherein said master server sends an assisting node processing request to the host of the second file system comprising at least one new cryptographic key generated by the host of the first file system.

22. The system of embodiment 21, further comprising a step wherein said master server receives an assisting node processing response comprising a plurality of metrics related to the operational state of the host of the second file system.

23. The system of embodiment 22, further comprising a step wherein said master server receives a network reconfiguration request comprising a command to delete a vector describing a relation between the first file system and the second file system.

24. The system of embodiment 23, further comprising a step wherein said master server sends an assisting node reconfiguration request to the host of the second file system comprising at least one command to disable at least one cryptographic key corresponding to the host of the first file system.

25. The system of embodiment 24, wherein a synchronization request generated by the host of the first file system is declined by the host of the second file system.

26. The system of embodiment 25, further comprising a step wherein said master server sends an assisting node reconfiguration request to the host of the first file system comprising at least one command to delete a vector from a remote backup schedule.

Other embodiments of the BDR may include:

1. An apparatus for managing the replication and storage of data sets, comprising:
   a memory; and
   a processor disposed in communication with said memory, and configured to issue a plurality of processing instructions stored in the memory, wherein the processor issues instructions to:
   send a backup request according to a backup and snapshot schedule;
   receive at a host of a first file system a backup response comprising image enabled backup data reflecting the state and content of a computer device;
   capture a snapshot of the image enabled backup data, and storing the snapshot in the first file system;
   validate according to a remote backup schedule a vector comprising a data set indicator corresponding to the computer device, and a mirroring relationship between the first file system and a second file system;
   send a task processing assistance request to a master server comprising a vector identifier, wherein the task processing assistance request is sent according to a first prioritization order comprising a user's defined prioritized replication order and a second prioritization order comprising a prioritized actions' execution order; and
   synchronize the first file system with the second file system only after receiving a task processing assistance response from the master server validating the mirroring relationship.

2. The apparatus of embodiment 1, wherein the said received image enabled backup data is selected from the group consisting of full backup data, differential backup data and incremental backup data.

3. The apparatus of embodiment 1, wherein the image enabled backup data is stored in the first file system and the captured snapshot is associated with the time when the image enabled backup data was generated.

4. The apparatus of embodiment 1, wherein the captured snapshot comprises an incremental relation mirroring data blocks that have been modified in the computer system from the time when a previously received image enabled backup data was generated to the time when the current image enabled backup data was generated, and associating the snapshot with the time when the current image enabled backup data was generated.

5. The apparatus of embodiment 4, wherein each snapshot can serve as a restore point for the computer device corresponding to its associated time;

6. The apparatus of embodiment 4, further comprising instructions to generate a rapid recovery file in a ready-to-run disk image format corresponding to the image enabled backup data received by the host of the first file system in the current backup response and storing the rapid recovery file in the first file system.

7. The apparatus of embodiment 6, wherein the first and second file system can be synchronized at a different frequency than the frequency on which the backup responses are received by the host of the first file system.

8. The apparatus of embodiment 5, wherein the host of the first file system is different from a host of the second file system.

9. The apparatus of embodiment 8, wherein the task processing assistance request further comprises at least one new cryptographic key generated by the host of the first file system and a plurality of metrics related to the operational state of the host of the first file system.

10. The apparatus of embodiment 9, further comprising a step wherein said master server sends an assisting node processing request to the host of the second file system comprising at least one new cryptographic key generated by the host of the first file system.

11. The apparatus of embodiment 10, further comprising a step wherein said master server receives an assisting node processing response comprising a plurality of metrics related to the operational state of the host of the second file system.

12. The apparatus of embodiment 11, further comprising a step wherein said master server receives a network reconfiguration request comprising a command to delete a vector describing a relation between the first file system and the second file system.

13. The apparatus of embodiment 12, further comprising a step wherein said master server sends an assisting node reconfiguration request to the host of the second file system comprising at least one command to disable at least one cryptographic key corresponding to the host of the first file system.

14. The apparatus of embodiment 13, wherein a synchronization request generated by the host of the first file system is declined by the host of the second file system.

15. The apparatus of embodiment 14, further comprising a step wherein said master server sends an assisting node reconfiguration request to the host of the first file system comprising at least one command to delete a vector from a remote backup schedule.

16. The apparatus of embodiment 3, wherein each snapshot can serve as a restore point for the computer device corresponding to its associated time;

17. The apparatus of embodiment 3, further comprising instructions to generate a rapid recovery file in a ready-to-run disk image format corresponding to the image enabled backup data received by the host of the first file system in the current backup response and storing the rapid recovery file in the first file system.

18. The apparatus of embodiment 17, wherein the first and second file system can be synchronized at a different frequency than the frequency on which the backup responses are received by the host of the first file system.

19. The apparatus of embodiment 16, wherein the host of the first file system is different from a host of the second file system.

20. The apparatus of embodiment 19, wherein the task processing assistance request further comprises at least one new cryptographic key generated by the host of the first file system and a plurality of metrics related to the operational state of the host of the first file system.

21. The apparatus of embodiment 20, further comprising a step wherein said master server sends an assisting node processing request to the host of the second file system comprising at least one new cryptographic key generated by the host of the first file system.

22. The apparatus of embodiment 21, further comprising a step wherein said master server receives an assisting node processing response comprising a plurality of metrics related to the operational state of the host of the second file system.

23. The apparatus of embodiment 22, further comprising a step wherein said master server receives a network reconfiguration request comprising a command to delete a vector describing a relation between the first file system and the second file system.

24. The apparatus of embodiment 23, further comprising a step wherein said master server sends an assisting node reconfiguration request to the host of the second file system comprising at least one command to disable at least one cryptographic key corresponding to the host of the first file system.

25. The apparatus of embodiment 24, wherein a synchronization request generated by the host of the first file system is declined by the host of the second file system.

26. The apparatus of embodiment 25, further comprising a step wherein said master server sends an assisting node reconfiguration request to the host of the first file system comprising at least one command to delete a vector from a remote backup schedule.

Other embodiments of the BDR may include:

1. A non-transitory medium storing instructions for managing the replication and storage of data sets to:
   send a backup request according to a backup and snapshot schedule;
   receive at a host of a first file system a backup response comprising image enabled backup data reflecting the state and content of a computer device;
   capture a snapshot of the image enabled backup data, and storing the snapshot in the first file system;
   validate according to a remote backup schedule a vector comprising a data set indicator corresponding to the computer device, and a mirroring relationship between the first file system and a second file system;
   send a task processing assistance request to a master server comprising a vector identifier, wherein the task processing assistance request is sent according to a first prioritization order comprising a user's defined prioritized replication order and a second prioritization order comprising a prioritized actions' execution order; and
   synchronize the first file system with the second file system only after receiving a task processing assistance response from the master server validating the mirroring relationship.

2. The medium of embodiment 1, wherein the said received image enabled backup data is selected from the group consisting of full backup data, differential backup data and incremental backup data.

3. The medium of embodiment 1, wherein the image enabled backup data is stored in the first file system and the captured snapshot is associated with the time when the image enabled backup data was generated.

4. The medium of embodiment 1, wherein the captured snapshot comprises an incremental relation mirroring data blocks that have been modified in the computer system from the time when a previously received image enabled backup data was generated to the time when the current image enabled backup data was generated, and associating the snapshot with the time when the current image enabled backup data was generated.

5. The medium of embodiment 4, wherein each snapshot can serve as a restore point for the computer device corresponding to its associated time;

6. The medium of embodiment 4, further comprising instructions to generate a rapid recovery file in a ready-to-run disk image format corresponding to the image enabled backup data received by the host of the first file system in the current backup response and storing the rapid recovery file in the first file system.

7. The medium of embodiment 6, wherein the first and second file system can be synchronized at a different frequency than the frequency on which the backup responses are received by the host of the first file system.

8. The medium of embodiment 5, wherein the host of the first file system is different from a host of the second file system.

9. The medium of embodiment 8, wherein the task processing assistance request further comprises at least one new cryptographic key generated by the host of the first file system and a plurality of metrics related to the operational state of the host of the first file system.

10. The medium of embodiment 9, further comprising a step wherein said master server sends an assisting node processing request to the host of the second file system comprising at least one new cryptographic key generated by the host of the first file system.

11. The medium of embodiment 10, further comprising a step wherein said master server receives an assisting node processing response comprising a plurality of metrics related to the operational state of the host of the second file system.

12. The medium of embodiment 11, further comprising a step wherein said master server receives a network reconfiguration request comprising a command to delete a vector describing a relation between the first file system and the second file system.

13. The medium of embodiment 12, further comprising a step wherein said master server sends an assisting node reconfiguration request to the host of the second file system comprising at least one command to disable at least one cryptographic key corresponding to the host of the first file system.

14. The medium of embodiment 13, wherein a synchronization request generated by the host of the first file system is declined by the host of the second file system.

15. The medium of embodiment 14, further comprising a step wherein said master server sends an assisting node reconfiguration request to the host of the first file system comprising at least one command to delete a vector from a remote backup schedule.

16. The medium of embodiment 3, wherein each snapshot can serve as a restore point for the computer device corresponding to its associated time;

17. The medium of embodiment 3, further comprising instructions to generate a rapid recovery file in a ready-to-run disk image format corresponding to the image enabled backup data received by the host of the first file system in the current backup response and storing the rapid recovery file in the first file system.

18. The medium of embodiment 17, wherein the first and second file system can be synchronized at a different frequency than the frequency on which the backup responses are received by the host of the first file system.

19. The medium of embodiment 16, wherein the host of the first file system is different from a host of the second file system.

20. The medium of embodiment 19, wherein the task processing assistance request further comprises at least one new cryptographic key generated by the host of the first file system and a plurality of metrics related to the operational state of the host of the first file system.

21. The medium of embodiment 20, further comprising a step wherein said master server sends an assisting node processing request to the host of the second file system comprising at least one new cryptographic key generated by the host of the first file system.

22. The medium of embodiment 21, further comprising a step wherein said master server receives an assisting node processing response comprising a plurality of metrics related to the operational state of the host of the second file system.

23. The medium of embodiment 22, further comprising a step wherein said master server receives a network reconfiguration request comprising a command to delete a vector describing a relation between the first file system and the second file system.

24. The medium of embodiment 23, further comprising a step wherein said master server sends an assisting node reconfiguration request to the host of the second file system comprising at least one command to disable at least one cryptographic key corresponding to the host of the first file system.

25. The medium of embodiment 24, wherein a synchronization request generated by the host of the first file system is declined by the host of the second file system.

26. The medium of embodiment 25, further comprising a step wherein said master server sends an assisting node reconfiguration request to the host of the first file system comprising at least one command to delete a vector from a remote backup schedule.

In order to address various issues and advance the art, the entirety of this application for BDR (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a BDR individual and/or enterprise user, database configuration and/or relational model, data type, data transmission and/or network framework, syntax structure, and/or the like, various embodiments of the BDR, may be implemented that enable a great deal of flexibility and customization. For example, aspects of the BDR may be adapted for single server backup (e.g., a server-local instantiation of the BDR to back up the local server itself), automatic discovery of client devices on a local network and automatic pairing of client devices with a backup aggregator device, file-based backups, and/or the like. While various embodiments and discussions of the BDR have been directed to image based hybrid cloud backup services, however, it is to be understood that the embodiments described herein may be readily configured and/or customized for a wide variety of other applications and/or implementations.

What is claimed is:

1. A processor implemented method for managing replication and storage of disk images of physical or virtual storage disks, the method comprising:
   sending a backup request, from a backup aggregator to a first client server at a first client site, according to a backup and snapshot schedule, wherein:
      the backup aggregator has a first file system; and
      the first client server has a first storage disk;
   receiving, at the backup aggregator, a backup response from the first client server at the first client site, the backup response comprising a first disk image reflecting a first state and content of the first storage disk of the first client server;
   capturing a first snapshot of the received first disk image, and storing the first snapshot in the first file system of the backup aggregator;
   sending, from the backup aggregator to a master server of a cloud storage center, a task processing assistance request comprising a backup vector, wherein:
      the backup vector comprises:
         a dataset indicator corresponding to the first disk image reflecting the first state and content of the first storage disk of the first client server; and
         a mirroring relationship between the first file system of the backup aggregator and a second file system of a first cloud storage server of the cloud storage center; and
      the task processing assistance request is sent according to:
         a first client site user predefined dataset priority order; and
         a second prioritization order based on at least one type of action associated with at least one task involved in the task processing assistance request;
   validating, by the master server, the backup vector received in the task processing assistance request; and
   synchronizing the first file system of the backup aggregator with the second file system of the first cloud storage server only after receiving a task processing assistance response from the master server acknowledging the validating of the backup vector.

2. The method of claim 1, wherein the said received first disk image is selected from the group consisting of full backup data, differential backup data and incremental backup data.

3. The method of claim 1, wherein the captured first snapshot is associated with a time when the first disk image was generated.

4. The method of claim 3, wherein:
   capturing a first snapshot comprises capturing a plurality of successive snapshots including the first snapshot; and
   each snapshot of the plurality of successive snapshots serves as a restore point for the first storage disk of the first client server at a corresponding time.

5. The method of claim 4, wherein the task processing assistance request further comprises:
   at least one new cryptographic key generated by the backup aggregator; and
   a first plurality of metrics related to the operational state of the backup aggregator.

6. The method of claim 5, further comprising sending by the master server an assisting node processing request to the first cloud storage server, wherein the assisting node processing request comprises the at least one new cryptographic key generated by the backup aggregator.

7. The method of claim 6, further comprising receiving by the master server an assisting node processing response comprising a second plurality of metrics related to the operational state of the first cloud storage server.

8. The method of claim 7, further comprising receiving by the master server a network reconfiguration request comprising a command to delete the backup vector describing the mirroring relationship between the first file system and the second file system.

9. The method of claim 8, further comprising sending by the master server an assisting node reconfiguration request to the first cloud storage server comprising at least one command to disable at least one cryptographic key corresponding to the backup aggregator.

10. The method of claim 9, wherein a synchronization request generated by the backup aggregator is declined by the first cloud storage server.

11. The method of claim 10, further comprising sending by the master server an assisting node reconfiguration request to the backup aggregator comprising at least one command to delete a vector from a remote backup schedule.

12. The method of claim 3, further comprising generating a rapid recovery file in a ready-to-run disk image format corresponding to the first disk image received at the backup aggregator and storing the rapid recovery file in the first file system.

13. The method of claim 12, wherein:
   the backup response is a first backup response;
   receiving a backup response from the first client server comprises receiving, at the backup aggregator and at a first frequency, a plurality of successive backup responses including the first backup response; and
   synchronizing the first file system with the second file system comprises synchronizing the first file system with the second file system at a different frequency than the first frequency.

14. The method of claim 1, wherein the captured first snapshot comprises an incremental relation mirroring data blocks that have been modified in the first storage disk from a first time when a previously received disk image was generated to a second time when the first disk image was generated, and the method further comprises associating the first snapshot with the second time when the first disk image was generated.

15. The method of claim 14, wherein:
   capturing a first snapshot comprises capturing a plurality of successive snapshots including the first snapshot; and each snapshot of the plurality of successive snapshots serves as a restore point for the first storage disk of the first client server at a corresponding time.

16. The method of claim 15, wherein the task processing assistance request further comprises:
   at least one new cryptographic key generated by the backup aggregator; and
   a first plurality of metrics related to the operational state of the backup aggregator.

17. The method of claim 16, further comprising sending by the master server an assisting node processing request to the first cloud storage server, wherein the assisting node processing request comprises the at least one new cryptographic key generated by the backup aggregator.

18. The method of claim 17, further comprising receiving by the master server an assisting node processing response comprising a second plurality of metrics related to the operational state of the first cloud storage server.

19. The method of claim 18, further comprising receiving by the master server a network reconfiguration request comprising a command to delete the backup vector describing the mirroring relationship between the first file system and the second file system.

20. The method of claim 19, further comprising sending by the master server an assisting node reconfiguration request to the first cloud storage server comprising at least one command to disable at least one cryptographic key corresponding to the backup aggregator.

21. The method of claim 20, wherein a synchronization request generated by the backup aggregator is declined by the first cloud storage server.

22. The method of claim 21, further comprising sending by the master server an assisting node reconfiguration request to the backup aggregator comprising at least one command to delete a vector from a remote backup schedule.

23. The method of claim 14, further comprising generating a rapid recovery file in a ready-to-run disk image format corresponding to the first disk image received at the backup aggregator and storing the rapid recovery file in the first file system.

24. The method of claim 23, wherein:
   the backup response is a first backup response;
   receiving a backup response from the first client server comprises receiving, at the backup aggregator and at a first frequency, a plurality of successive backup responses including the first backup response; and
   synchronizing the first file system with the second file system comprises synchronizing the first file system with the second file system at a different frequency than the first frequency.

25. A processor implemented method for managing the replication and storage of data sets comprising:
   sending a backup request according to a backup and snapshot schedule;
   receiving at a host of a first file system a backup response comprising image enabled backup data reflecting the state and content of a computer device;
   capturing a snapshot of the image enabled backup data, and storing the snapshot in the first file system;
   validating according to a remote backup schedule a vector comprising a data set indicator corresponding to the computer device, and a mirroring relationship between the first file system and a second file system;
   sending a task processing assistance request to a master server comprising a vector identifier, wherein the task processing assistance request is sent according to a first prioritization order comprising a user's defined prioritized replication order and a second prioritization order comprising a prioritized actions' execution order; and
   synchronizing the first file system with the second file system only after receiving a task processing assistance response from the master server validating the mirroring relationship,
   wherein the captured snapshot comprises an incremental relation mirroring data blocks that have been modified in the computer system from the time when a previously received image enabled backup data was generated to the time when the current image enabled backup data was generated, and associating the snapshot with the time when the current image enabled backup data was generated,
   wherein each snapshot can serve as a restore point for the computer device corresponding to its associated time,
   wherein the host of the first file system is different from a host of the second file system, and
   wherein the task processing assistance request further comprises at least one new cryptographic key generated by the host of the first file system and a plurality of metrics related to the operational state of the host of the first file system.

26. The method of claim 25, further comprising a step wherein said master server sends an assisting node processing request to the host of the second file system comprising at least one new cryptographic key generated by the host of the first file system.

27. The method of claim 26, further comprising a step wherein said master server receives an assisting node processing response comprising a plurality of metrics related to the operational state of the host of the second file system.

28. The method of claim 27, further comprising a step wherein said master server receives a network reconfiguration request comprising a command to delete a vector describing a relation between the first file system and the second file system.

29. The method of claim 28, further comprising a step wherein said master server sends an assisting node reconfiguration request to the host of the second file system comprising at least one command to disable at least one cryptographic key corresponding to the host of the first file system.

30. The method of claim 29, wherein a synchronization request generated by the host of the first file system is declined by the host of the second file system.

31. The method of claim 30, further comprising a step wherein said master server sends an assisting node reconfiguration request to the host of the first file system comprising at least one command to delete a vector from a remote backup schedule.

32. A processor implemented method for managing the replication and storage of data sets comprising:
   sending a backup request according to a backup and snapshot schedule;
   receiving at a host of a first file system a backup response comprising image enabled backup data reflecting the state and content of a computer device;
   capturing a snapshot of the image enabled backup data, and storing the snapshot in the first file system;
   validating according to a remote backup schedule a vector comprising a data set indicator corresponding to the computer device, and a mirroring relationship between the first file system and a second file system;
   sending a task processing assistance request to a master server comprising a vector identifier, wherein the task processing assistance request is sent according to a first prioritization order comprising a user's defined prioritized replication order and a second prioritization order comprising a prioritized actions' execution order; and synchronizing the first file system with the second file system only after receiving a task processing assistance response from the master server validating the mirroring relationship, wherein the image enabled backup data is stored in the first file system and the captured snapshot is associated with the time when the image enabled backup data was generated, wherein each snapshot can serve as a restore point for the computer device corresponding to its associated time, wherein the host of the first file system is different from a host of the second file system, and wherein the task processing assistance request further comprises at least one new cryptographic key generated by the host of the first file system and a plurality of metrics related to the operational state of the host of the first file system.

33. The method of claim 32, further comprising a step wherein said master server sends an assisting node processing request to the host of the second file system comprising at least one new cryptographic key generated by the host of the first file system.

34. The method of claim 33, further comprising a step wherein said master server receives an assisting node processing response comprising a plurality of metrics related to the operational state of the host of the second file system.

35. The method of claim 34, further comprising a step wherein said master server receives a network reconfiguration request comprising a command to delete a vector describing a relation between the first file system and the second file system.

36. The method of claim 35, further comprising a step wherein said master server sends an assisting node reconfiguration request to the host of the second file system comprising at least one command to disable at least one cryptographic key corresponding to the host of the first file system.

37. The method of claim 36, wherein a synchronization request generated by the host of the first file system is declined by the host of the second file system.

38. The method of claim 37, further comprising a step wherein said master server sends an assisting node reconfiguration request to the host of the first file system comprising at least one command to delete a vector from a remote backup schedule.

39. In a system comprising a master server, a storage server communicatively coupled to the master server via a network, and a backup aggregator communicatively coupled to the master server and the storage server via the network, wherein the backup aggregator has a snapshot-capable file system, a method for replicating on the backup aggregator a plurality of content states of a client computing device and managing storage, on the storage server, of at least some of the replicated plurality of content states of the client computing device, wherein the client computing device is communicatively coupled to the backup aggregator via the network, the method comprising:

A) receiving at the backup aggregator, from the client computing device via the network, a succession of image-based backup files respectively representing the plurality of content states of the client computing device as a function of time;

B) taking respective snapshots, at the backup aggregator, of the succession of image-based backup files, and storing the respective snapshots in the snapshot-capable file system of the backup aggregator;

C) transmitting from the backup aggregator, to the master server via the network, a task processing assistance request including a mirroring relationship stored at the backup aggregator, wherein the mirroring relationship specifies an identifier for the backup aggregator and at least one destination identifier for the storage server;

D) in response to C), receiving at the backup aggregator, from the master server via the network, a task processing assistance response including either an acknowledgement of the mirroring relationship or an instruction to remove the mirroring relationship stored at the backup aggregator; and E) transmitting from the backup aggregator, to the storage server via the network, a send file representing differential changes between the at least some of the respective snapshots of the succession of image-based backup files if the task processing assistance response received in D) includes the acknowledgement of the mirroring relationship, wherein in C), the task processing assistance request is transmitted by the backup aggregator to the master server based at least in part on a client-defined task prioritization order relating to a criticality of the plurality of content states of the client computing device.

40. A backup aggregator to replicate a plurality of content states of a client computing device and to manage storage, on a storage server, of at least some of the replicated plurality of content states of the client computing device, the backup aggregator comprising:

at least one communication interface;

at least one memory to store:

processor-executable instructions;

a mirroring relationship that specifies an identifier for the backup aggregator and at least one destination identifier for the storage server; and a client-defined task prioritization order relating to a criticality of the plurality of content states of the client computing device; and at least one processor communicatively coupled to the at least one communication interface and the at least one memory, wherein upon execution by the at least one processor of the processor-executable instructions, the at least one processor controls the at least one memory so as to implement a snapshot-capable file system for the backup aggregator, and wherein the at least one processor further:

A) controls the at least one communication device to receive from the client computing device a succession of image-based backup files respectively representing the plurality of content states of the client computing device as a function of time;

B) takes respective snapshots of the succession of image-based backup files;

C) controls the at least one memory to store the respective snapshots in the snapshot-capable file system;

D) controls the at least one communication interface to transmit to a master server a task processing assistance request including the mirroring relationship;

E) controls the at least one communication interface to receive from the master server a task processing assistance response including either an acknowledgement of the mirroring relationship or an instruction to remove the mirroring relationship stored in the at least one memory; and F) controls the at least one communication interface to transmit to the storage server a send file representing differential changes between the at least some of the respective snapshots of the succession of image-based backup files if the task processing assistance response received in E) includes the acknowledgement of the mirroring relationship, wherein in D), the at least one processor controls the at least one communication interface to transmit the task processing assistance request to the master server based at least in part on the client-defined task prioritization order stored in the at least one memory and relating to the criticality of the plurality of content states of the client computing device.

* * * * *